US010223174B2

(12) United States Patent
Johnson et al.

(10) Patent No.: US 10,223,174 B2
(45) Date of Patent: Mar. 5, 2019

(54) TENANT ENGAGEMENT SIGNAL ACQUISITION AND EXPOSURE

(71) Applicant: Microsoft Technology Licensing, LLC, Redmond, WA (US)

(72) Inventors: Warren Johnson, Sammamish, WA (US); Matt J. Lopez, Seattle, WA (US); Paul Sanjeev Balarajan, Bellevue, WA (US); Andy K J. Siow, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 139 days.

(21) Appl. No.: 15/099,724

(22) Filed: Apr. 15, 2016

(65) Prior Publication Data

US 2017/0168877 A1   Jun. 15, 2017

Related U.S. Application Data

(63) Continuation-in-part of application No. 15/052,271, filed on Feb. 24, 2016, now Pat. No. 9,686,406, which is a continuation-in-part of application No. 14/995,596, filed on Jan. 14, 2016, now Pat. No. 9,654,639, and a continuation-in-part of application No. 14/965,537, filed on Dec. 10, 2015.

(51) Int. Cl.
*G06F 9/54* (2006.01)
*G06Q 10/06* (2012.01)

(52) U.S. Cl.
CPC ..... *G06F 9/541* (2013.01); *G06Q 10/063112* (2013.01)

(58) Field of Classification Search
CPC ........................................................ G06F 9/542
See application file for complete search history.

(56) References Cited

U.S. PATENT DOCUMENTS

| | | | |
|---|---|---|---|
| 5,206,903 A | 4/1993 | Kohler et al. | |
| 5,825,869 A | 10/1998 | Brooks et al. | |
| 6,021,403 A | 2/2000 | Horvitz et al. | |
| 6,131,122 A | 10/2000 | Sampson | |
| 6,298,457 B1 | 10/2001 | Rachlin et al. | |
| 6,453,038 B1 | 9/2002 | McFarlane et al. | |
| 6,542,601 B1 | 4/2003 | Hernandez et al. | |
| 6,704,409 B1 | 3/2004 | Dilip et al. | |
| 6,742,141 B1 | 5/2004 | Miller | |

(Continued)

FOREIGN PATENT DOCUMENTS

| | | |
|---|---|---|
| EP | 2763436 A1 | 8/2014 |
| WO | 2015006308 A1 | 1/2015 |

OTHER PUBLICATIONS

"Second Written Opinion Issued in PCT Application No. PCT/US2016/063735", dated Nov. 6. 2017, 6 Pages.

(Continued)

*Primary Examiner* — Umut Onat
(74) *Attorney, Agent, or Firm* — Christopher J. Volkmann; Kelly, Holt & Christenson, PLLC

(57) ABSTRACT

Tenant engagement signals are exposed to third party systems through an application programming interface (API). The third parties acquire the signals through the API, surface them, and launch workflows based on the tenant engagement signals acquired, in order to assist the tenant in the on-boarding process.

18 Claims, 27 Drawing Sheets

(56) References Cited

U.S. PATENT DOCUMENTS

| | | | |
|---|---|---|---|
| 7,769,161 | B1 | 8/2010 | Hession et al. |
| 7,958,494 | B2 | 6/2011 | Chaar et al. |
| 8,001,527 | B1 | 8/2011 | Qureshi et al. |
| 8,555,113 | B2 | 10/2013 | Fan et al. |
| 8,588,395 | B2 | 11/2013 | Hendricks et al. |
| 8,589,323 | B2 | 11/2013 | Keith, Jr. |
| 8,638,925 | B1 | 1/2014 | Billman |
| 8,718,272 | B2 | 5/2014 | Desai et al. |
| 8,737,598 | B2 | 5/2014 | Bruce et al. |
| 8,793,359 | B1 | 7/2014 | Fiebig et al. |
| 8,837,704 | B2 | 9/2014 | Ramanathan et al. |
| 8,837,711 | B2 | 9/2014 | Vasquez et al. |
| 8,874,636 | B2 | 10/2014 | Tuchman et al. |
| 8,949,939 | B2 | 2/2015 | Peddada |
| 8,965,957 | B2 | 2/2015 | Barros |
| 9,026,851 | B2 | 5/2015 | Mondal et al. |
| 9,654,639 | B1 | 5/2017 | Balarajan et al. |
| 9,686,406 | B1 | 6/2017 | Lopez et al. |
| 2004/0161097 | A1 | 8/2004 | Henry |
| 2005/0131943 | A1 | 6/2005 | Lewis et al. |
| 2006/0062374 | A1 | 3/2006 | Gupta |
| 2007/0100782 | A1 | 5/2007 | Reed et al. |
| 2007/0116185 | A1 | 5/2007 | Savoor et al. |
| 2007/0133755 | A1 | 6/2007 | Jean et al. |
| 2007/0168874 | A1 | 7/2007 | Kloeffer et al. |
| 2008/0263077 | A1 | 10/2008 | Boston |
| 2009/0076871 | A1 | 3/2009 | Heacock |
| 2009/0119147 | A1 | 5/2009 | Messer |
| 2009/0181665 | A1 | 7/2009 | Sater et al. |
| 2010/0257583 | A1 | 10/2010 | Ngo et al. |
| 2011/0225636 | A1 | 9/2011 | Keith et al. |
| 2012/0054731 | A1 | 3/2012 | Aravamudan et al. |
| 2012/0072229 | A1 | 3/2012 | Zaldivar et al. |
| 2012/0076283 | A1 | 3/2012 | Ajmera et al. |
| 2012/0101865 | A1 | 4/2012 | Zhakov |
| 2012/0309351 | A1 | 12/2012 | Dutta |
| 2013/0013475 | A1 | 1/2013 | Marakowitz et al. |
| 2013/0046571 | A1 | 2/2013 | Tuchman et al. |
| 2013/0090976 | A1 | 4/2013 | White et al. |
| 2013/0103749 | A1 | 4/2013 | Werth et al. |
| 2013/0103973 | A1 | 4/2013 | Werth et al. |
| 2013/0173479 | A1 | 7/2013 | Paz Salgado et al. |
| 2013/0198039 | A1 | 8/2013 | Sridharan et al. |
| 2013/0325726 | A1 | 12/2013 | Tuchman et al. |
| 2014/0006292 | A1 | 1/2014 | Kozlovsky et al. |
| 2014/0108073 | A1 | 4/2014 | Castel et al. |
| 2014/0119531 | A1 | 5/2014 | Tuchman et al. |
| 2014/0162611 | A1 | 6/2014 | Mezhibovsky et al. |
| 2014/0171034 | A1 | 6/2014 | Aleksin et al. |
| 2014/0236934 | A1 | 8/2014 | Boyle et al. |
| 2014/0245141 | A1 | 8/2014 | Yeh et al. |
| 2014/0278646 | A1 | 9/2014 | Adrian et al. |
| 2014/0278785 | A1 | 9/2014 | Gaedcke et al. |
| 2014/0279718 | A1 | 9/2014 | Southey et al. |
| 2014/0297743 | A1 | 10/2014 | Zyto et al. |
| 2014/0324647 | A1 | 10/2014 | Iyoob et al. |
| 2014/0336795 | A1 | 11/2014 | Asenjo et al. |
| 2015/0026254 | A1 | 1/2015 | Keller et al. |
| 2015/0074785 | A1 | 3/2015 | Driscoll et al. |
| 2015/0100359 | A1 | 4/2015 | Brunet et al. |
| 2015/0135013 | A1 | 5/2015 | Thomas et al. |
| 2015/0147999 | A1 | 5/2015 | Venezia et al. |
| 2015/0195407 | A1 | 7/2015 | Kaufman |
| 2015/0281454 | A1 | 10/2015 | Milstein et al. |
| 2015/0370621 | A1* | 12/2015 | Karp ............... G05B 15/02 719/328 |
| 2016/0239352 | A1* | 8/2016 | Evans ............... G06F 9/54 |
| 2016/0267551 | A1 | 9/2016 | Zheng et al. |
| 2016/0283889 | A1 | 9/2016 | Shukla et al. |
| 2017/0091778 | A1 | 3/2017 | Johnson et al. |
| 2017/0091779 | A1 | 3/2017 | Johnson et al. |
| 2017/0169437 | A1 | 6/2017 | Balarajan et al. |
| 2017/0171389 | A1 | 6/2017 | Lopez et al. |
| 2017/0249643 | A1 | 8/2017 | Lopez et al. |

OTHER PUBLICATIONS

Amendment for U.S. Appl. No. 14/995,596 dated Nov. 29, 2016, 13 pages.
Notice of Allowance for U.S. Appl. No. 14/995,596 dated Jan. 25, 2017, 10 pages.
Amendment After Notice of Allowance for U.S. Appl. No. 14/995,596 dated Feb. 7, 2017, 8 pages.
Notice of Allowance for U.S. Appl. No. 15/052,271 dated Feb. 14, 2017, 9 pages.
International Search Report, and Written Opinion for International Patent Application No. PCT/US2016/063747, dated Feb. 7, 2017, date of filing: Nov. 25, 2016, 12 pages.
International Search Report and Written Opinion for International Patent Application No. PCT/US2016/063735, dated Feb. 7, 2017, date of filing: Nov. 25, 2016, 11 pages.
International Search Report and Written Opinion for International Patent Application No. PCT/US2016/063748, dated Feb. 7, 2017, date of filing Nov. 25, 2016, 12 pages.
"Onboarding API Guide—Java", Retrieved on: Feb. 17, 2016 Available at: https://allseenalliance.org/framework/documentation/develop/api-guide/onboarding/java.
"Oracle TBE Onboarding Cloud Service", Retrieved on: Feb. 17, 2016 Available at: http://www.oracle.com/us/media1/tbe-onboarding-cloud-service-1676869.pdf.
"Axway API Gateway", Published on: Apr. 21, 2015 Available at: https://www.axway.com/sites/default/files/datasheet_files/axway_datasheet_api-gateway_en.pdf.
"Microsoft FastTrack: getting your customers to the cloud", Retrieved on: Feb. 17, 2016 Available at: https://partner.microsoft.com/en-US/Solutions/fasttrack.
Danielson, Steve, "What is Azure API Management?", Published on: Sep. 21, 2015 Available at: https://azure.microsoft.com/en-in/documentation/articles/api-management-get-started/.
"Microsoft FastTrack: getting your customers to the cloud", Retrieved on Jul. 31, 2015 Available at: https://mspartner.microsoft.com/en/us/pages/solutions/fasttrack.aspx#overview.
"TAG Solutions Managed Services Onboarding Process Outline", Retrieved on: Jul. 31, 2015 Available at: http://tagsolutions.com/managed-services/customer-onboarding-outline/.
"Mailbox Migration to Exchange Online", Published on: Jun. 20, 2015 Available at: https://technet.microsoft.com/en-us/library/jj863291(v=exchg.150).aspx.
U.S. Appl. No. 15/052,271, filed Feb. 24, 2016 Application and drawings. 65 pages.
U.S. Appl. No. 14/995,596, filed Jan. 14, 2016 Application and drawings. 64 pages.
"Inbound Automatic Call Distribution (ACD) Systems", Retrieved on: Jul. 27, 2015 Available at: http://www.aspect.com/in/solutions/customer-experience/inbound-automatic-call-distribution-acd-systems.
Cyriac, Francis "Ameyo Callversations", Published on Jan. 29, 2015 Available at: http://www.ameyo.com/blog/ameyo-call-center-integration-with-freshdesk.
"Verint", Retrieved on: Jul. 28, 2015 Available at: http://www.verint.com/solutions/customer-engagement-optimization/voice-of-the-customer-analytics/products/text-analytics/.
"Eptica enables businesses to increase revenue from customer service with new Multichannel Customer Interaction Suite", Published on: Apr. 9, 2013 Available at: http://www.eptica.com/eptica-enables-businesses-increase-revenue-customer-service-new-multichannel-customer-interaction.
"Interaction Analytics?", Retrieved on: Jul. 28, 2015 Available at: http://www.nice.com/engage/workforce-optimization/interaction-analytics.
"Avaya Aura Contact Center Software Review", Published on: Jan. 9, 2012 Available at: http://www.crmsearch.com/avaya-contact-center-capabilities.php.
"Contact center", Published on: Jul. 16, 2012 Available at: http:msdn.microsoft.com/en-us/library/office/dn465935.aspx.
U.S. Appl. No. 14/965,537, filed Dec. 10, 2015 Application and drawings. 49 pages.

(56) References Cited

OTHER PUBLICATIONS

Non-Final Office Action for U.S. Appl. No. 14/995,596 dated Sep. 15, 2016, 11 pages.
"International Preliminary Report on Patentability Issued in PCT Application No. PCT/US2016/063735", dated Mar. 20, 2018, 7 Pages.
"Chatstack", Retrieved From: https://www.chatstack.com/android, Jul. 24, 2015, 4 Pages.
"Concierge & Lifestyle Management", Retrieved From: https://web.archive.org/web/20160331121136/https://rideau.com/programs/Concierge, Jun. 29, 2013, 1 Page.
"Customer Concierge", Retrieved From: http://circles.com/offer/customer-concierge/, Oct. 13, 2014, 2 Pages.
"Desk", Retrieved From: https://web.archive.org/web/20150715102931/http://www.desk.com/product, Dec. 30, 2014, 5 Pages.
"Don't ship your app without HelpStack", Retrieved From: http://www.helpstack.io/, May 16, 2014, 6 Pages.
"Happyfox", Retrieved From: https://www.happyfox.com/, Jan. 2014, 5 Pages.
"Improving IT Help Desk Services with Vendor Support", Retrieved From: https://searchdatacenter.techtarget.com/tip/Improving-IT-help-desk-services-with-vendor-support, Feb. 2011, 4 Pages.
"Kayako", Retrieved From: https://web.archive.org/web/20140730001822/https://www.kayako.com/product/tour, Jul. 4, 2014, 8 Pages.
"In-app Customer Support for Mobile Apps". Retrieved From: https://web.archive.org/web/20150226182022/http://freshdesk.com/mobihelp, Feb. 13, 2015, 6 Pages.
"Make It Easy to Engage Users With In-App Feedback & Support", Retrieved From: https://web.archive.org/web/20150106160919/https://www.helpshift.com/, Jan. 6, 2015, 3 Pages.
"Nexsan Increases Customer and Partner Service Levels with New Facilities and Enhanced Support Infrastructure", Retrieved From: https://www.varinsights.com/doc/nexsan-increases-customer-and-partner-service-levels-with-new-facilities-and-enhanced-support-infrastructure-0001, May 3, 2012, 3 Pages.
"Salesforce Partner Program Guide for Consulting Partners", Retrieved From: https://www.google.co.in/url?sa=t&rct=j&q=&esrc=s&source=web&cd=7&cad=rja&uact=8&ved=OCD8QFjAGahUKEwi9ktLF2P3GAhVJBY4KHdFTCEU&url=https%3A%%2F%2Fpartners.salesforce.com%2Fs%2FFFY15CioudAlliancePartnerProgramGuide1.pdf%3Fv%3D2&ei=am03Vb21 EcmKuA TRp6GoBA&usg=AFQjCNFcNAqaCnaDws41fKEjbUYM5Waw9g&sig2=BY66hSmP8N-, Feb. 2015, 24 Pages.
"SmarterTools", Retrieved From: https://www.smartertools.com/smartertrack/online-help-desk, Mar. 15, 2015, 2 Pages.
"Support Swarming Boosts Productivity, Satisfaction & Retention", In BOMGAR Whitepaper, May 15, 2013, 4 Pages.
"Zendesk", Retrieved From: https://www.zendesk.com/product/mobile/, 3 Pages.
"Non Final Office Action Issued in U.S. Appl. No. 14/870,636", dated May 3, 2018, 40 Pages.
"Non Final Office Action Issued in U.S. Appl. No. 14/870,795", dated Jun. 29, 2018, 36 Pages.
"Non Final Office Action Issued in U.S. Appl. No. 15/593,642", dated Apr. 19, 2018, 12 Pages.
Antequino, J J., "Have You Used Your Microsoft Virtual Partner Concierge?", Retrieved From: https://blogs.technet.microsoft.com/uspartner_ts2team/2011/04/20/have-you-used-your-microsoft-virtual-partner-concierge/, Apr. 20, 2011, 1 Page.
Mills, et al., "The Golden Keys Being Served: Concierge Services and Customer Satisfaction", In Journal of International Business & Cultural Studies, vol. 1, Feb. 2009, 12 Pages.
Molen, Brad, "Samsung Launches Customer Service App on Android as Proof that it Cares", Retrieved From: https://www.engadget.com/2012/05/17/samsung-customer-service-app-android/, May 17, 2012, 3 Pages.
"International Preliminary Report on Patentability Issued in PCT Application No. PCT/US2016/053636", dated Nov. 27, 2017, 9 Pages.
"International Search Report and Written Opinion Issued in PCT Application No. PCT/US2016/053636", dated Nov. 10, 2016, 14 Pages.
"Second Written opinion Issued in PCT Application No. PCT/US2016/053636", dated Aug. 10, 2017, 9 Pages.
"International Preliminary Report on Patentability Issued in PCT Application No. PCT/US2016/063747", dated Mar. 20, 2018, 8 Pages.
"Second Written Opinion Issued in PCT Application No. PCT/US2016/063747", dated Nov. 6, 2017, 7 Pages.
"International Preliminary Report on Patentability Issued in PCT Application No. PCT/US2016/063748", dated Mar. 20, 2018, 7 Pages.
"Second Written Opinion Issued in PCT Application No. PCT/US2016/063748", dated Nov. 6, 2017, 7 Pages.
"International Preliminary Report on Patentability Issued in PCT Application No. PCT/US2017/012659", dated Mar. 23, 2018, 8 Pages.
"International Search Report and Written Opinion Issued in PCT Application No. PCT/US2017/012659", dated Feb. 23, 2017, 12 Pages.
"Second Written Opinion Issued in PCT Application No. PCT/US2017/012659", dated Dec. 6, 2017, 7 Pages.
"Final Office Action Issued in U.S. Appl. No. 15/593,642", dated Sep. 14, 2018, 10 Pages.
"Final Office Action Issued in U.S. Appl. No. 14/870,636", dated Nov. 29, 2018, 47 Pages.
"Final Office Action Issued in U.S. Appl. No. 14/965,537", dated Nov. 13, 2018, 10 Pages.

* cited by examiner

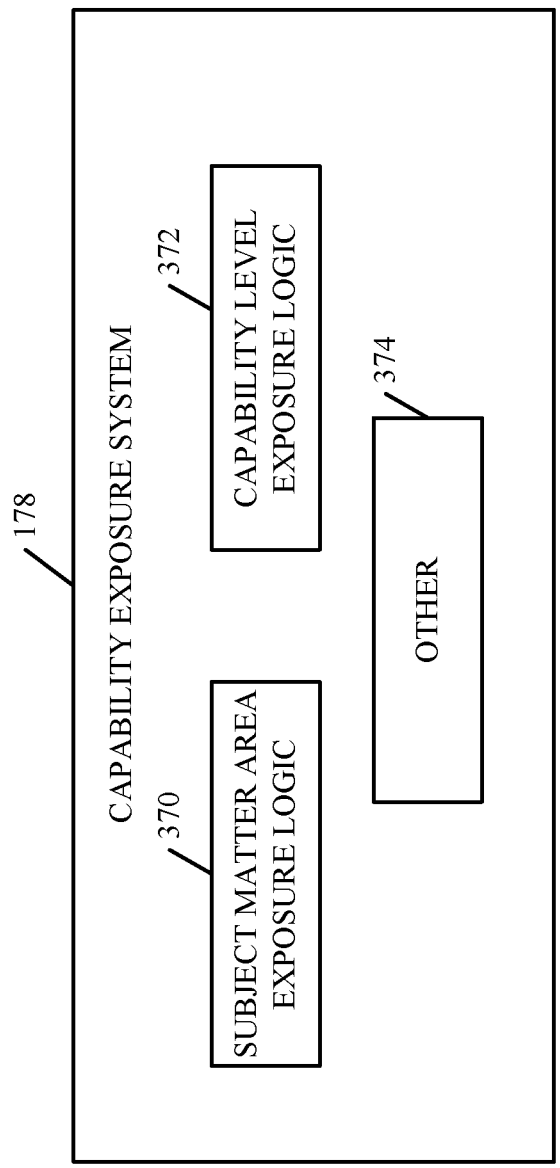

TENANT ENGAGEMENT SIGNAL ACQUISITION AND EXPOSURE

The present application is a continuation-in-part of and claims priority of U.S. patent application Ser. No. 15/052,271, filed Feb. 24, 2016, and is a continuation-in-part of and claims priority of U.S. patent application Ser. No. 14/995,596, filed Jan. 14, 2016, and is also a continuation-in-part of the and claims priority of U.S. patent application Ser. No. 14/965,537, filed Dec. 10, 2015, content of which is hereby incorporated by reference in its entirety.

BACKGROUND

Computer systems are currently in wide use. Some computer systems host multi-tenant systems for organizations. Each tenant corresponds to a different organization, and each organization may have a number of different users, each of whom use a client device.

Such multi-tenant systems often allow tenants, or even individual users, to add services that are hosted by the multi-tenant computing system. The process by which a user or tenant adds a service is sometimes referred to as on-boarding. It can be difficult for a user or tenant to add a service. The on-boarding process by which a service is added, or by which a tenant or user registers for a service, can be cumbersome and technically complicated. In addition, even after a service is successfully added, some tenants find it difficult to have their users engage with a new service, and actually use it, successfully.

In order to address these types of problems, some companies provide technical support services. To take advantage of such services, a user often needs to call, by telephone, or to contact the technical support personnel using some type of electronic messaging. When a technical support request is received, it is often routed to an individual technician or agent who may be able to help with the problem. However, the problems are often incorrectly, or incompletely, identified, at the beginning. Therefore, the user who is requesting technical support may be routed to one department or individual technician, who is not suited to address the problem. Therefore, the user is re-routed to another department or technician, and this process can be repeated. This can lead to a high level of dissatisfaction among users of the multi-tenant services.

The discussion above is merely provided for general background information and is not intended to be used as an aid in determining the scope of the claimed subject matter.

SUMMARY

Tenant engagement signals are exposed to third party systems through an application programming interface (API). The third parties acquire the signals through the API, surface them, and launch workflows based on the tenant engagement signals acquired, in order to assist the tenant in the on-boarding process.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 4A is a block diagram of one example of a capability exposure system.

DETAILED DESCRIPTION

Figure 1:
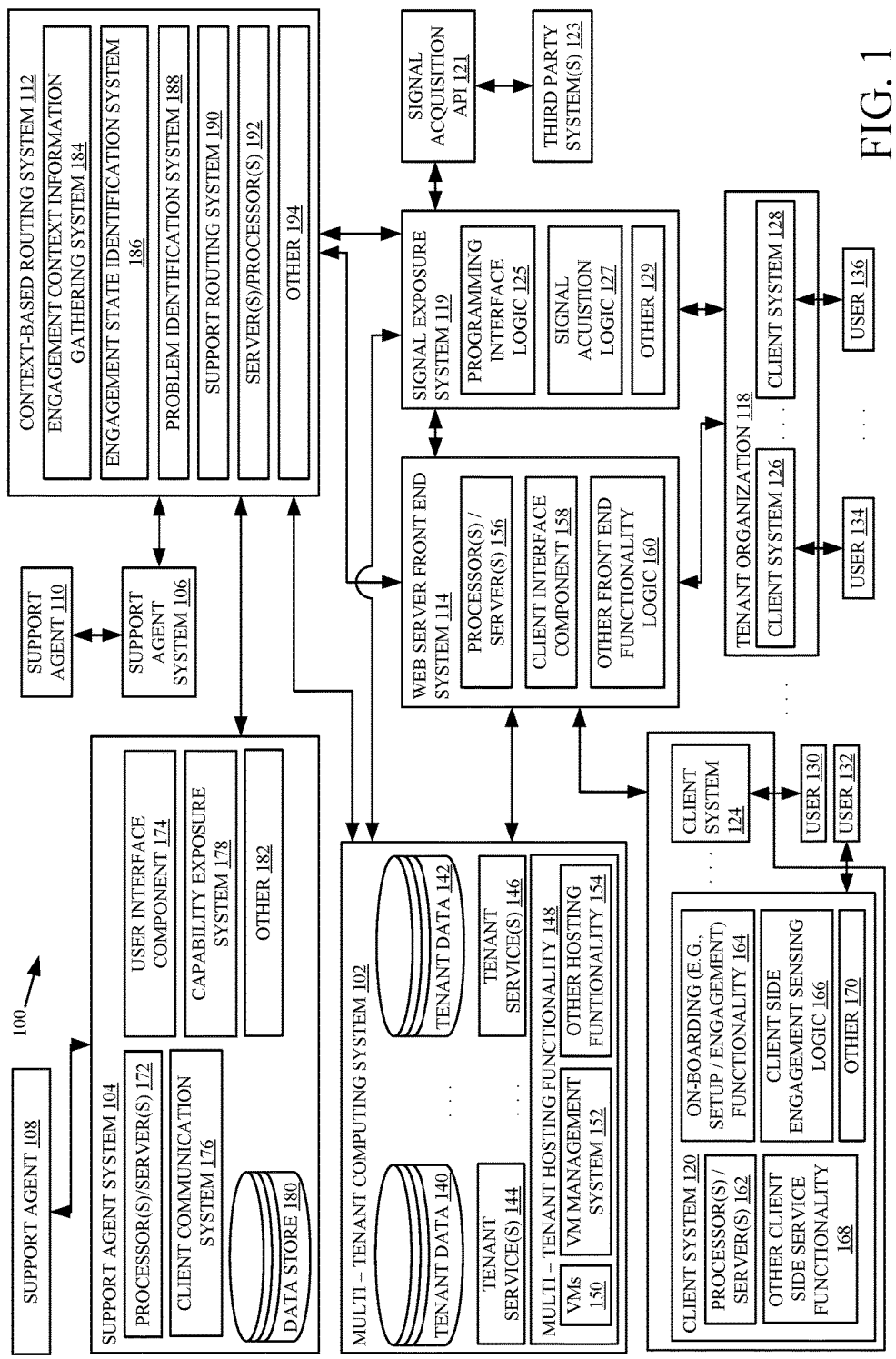
FIG. 1 is a block diagram of one example a multi-tenant computing system architecture.

FIG. 1 is a block diagram of one example of a multi-tenant computing system architecture 100. Architecture 100 illustratively includes multi-tenant computing system 102, one or more support agent systems 104-106, each of which can be used by one or more support agents 108-110. Architecture 100 also illustratively includes context-based routing system 112, web server front end system 114, and one or more tenant organizations 116-118 that interact with multi-tenant computing system 102 through web server front end system 114.

Each tenant organization 116-118 can include a plurality of client systems 120-128, and can be used by a plurality of users 130-136 in order to use server-side services in multi-tenant computing system 102. Each tenant organization may be a separate organization that accesses multi-tenant computing system 102 for hosted services, data, applications, etc. Users 130-136 each illustratively interact with one or more client systems 120-128 in order to control and manipulate not only the corresponding client systems, but multi-tenant computing system 102, as well.

Each of the client systems 120-128 can include one or more servers or processors 162, on-boarding (e.g., setup/engagement) functionality 164, engagement sensing logic 166, a wide variety of other client side service functionality 168, and it can include other items 170. Multi-tenant computing system 102 illustratively includes one or more sets of tenant data 140-142, and one or more sets of tenant services 144-146. It also illustratively includes multi-tenant hosting functionality 148 which, itself, can include one or more virtual machines 150, virtual machine management system 152, and a wide variety of other multi-tenant hosting functionality 154. Web server front end system 114 illustratively includes one or more servers or processors 156, client interface component 158, and it can include a wide variety of other front end functionality logic 160.

Support agents 108-110 illustratively interact with support agent systems 104-106 in order to provide support to users 130-136 (or tenants 116-118) when needed. Each support agent system 104 can include one or more processors or servers 172, user interface component 174, client communication system 176, capability exposure system 178, data store 180, and it can include a wide variety of other items 182.

Signal exposure system 119 illustratively exposes any or all tenant engagement signals from the various systems in architecture 100, through signal acquisition application programming interface (API) 121, to one or more third party systems 123. Third party systems 123 can perform a wide variety of different functions in response to those signals, some of which are described below with respect to FIGS. 9-11.

Users 130-136 illustratively interact with on-boarding (e.g., setup and engagement) functionality 164 in order to subscribe to (or setup) a client configuration to use multi-tenant services 144-146 or data. Engagement sensing logic 166 illustratively senses various metrics, values, inputs, and/or other information that is indicative of the state of readiness (e.g., the state of the setup of a tenant) as well as the state of engagement (e.g., the state of whether any users are successfully using the multi-tenant services, how many users are using the multi-tenant services, and at what level of usage—e.g., the level of sophistication of the usage, the volume or frequency of usage, etc.) and provides that information through web server front end system 114 to context-based routing system 112. Users 130-136 also illustratively use other client side service functionality 168 in order to engage with, and use, the multi-tenant services hosted by system 162.

Client interface component 158 in web server front end system 114 illustratively generates client interface data that can be used by the various client systems. The client interfaces can include user input mechanisms that can be actuated by users 130-136 in order to control and manipulate multi-tenant computing system 102.

Virtual machine management system 152 (which can include a hypervisor and/or other items) illustratively manages the creation, operation, and deletion, of various virtual machines 150. Multi-tenant hosting functionality 148 also illustratively provides the functionality that is used in order to host the multi-tenant services or data that is accessed by the various tenant organizations 116-118.

Tenant services 144-146 can be any of a wide variety of multi-tenant services that are hosted by system 102. The tenant data 140-142 illustratively corresponds to the individual tenants or tenant organizations 116-118. Therefore, the tenant services 144-146 can operate on the tenant data 140-142, and can provide other services as well.

It may be that, at some point, one of the users 130-136 (or one of the tenants or tenant organizations 116-118) encounters an issue. An issue, in this context, can be a problem encountered in the on-boarding process (such as in configuring a tenant service that the tenant has just subscribed to, or in engaging with that service, and using it). In that case, support agents 108-110 may interact with users 130-136 in order to address the issues. In doing so, context-based routing system 112 illustratively identifies context information for the tenant organization (and user) that is having the issue, and identifies a stage or steps in the on-boarding process (or a state of readiness and engagement) of that tenant (or user, or both) with respect to the service and a velocity with which the tenant or user is moving through the on-boarding process. It then identifies a support agent 108-110, based upon exposed capabilities that are exposed by agents 108-110 through capability exposure system 178. The client communication system in the corresponding support agent system is then used to communicate with a user of the given tenant, in order to address the issue.

As briefly mentioned above, context-based routing system 112 illustratively identifies context information regarding a tenant or tenant service, or even an individual user, that is having an issue. The context information is illustratively a stage or step that the tenant/user is on in the on-boarding process and a velocity indicator that indicates how quickly the tenant/user is progressing through that process. It then identifies a particular support agent, based on the capabilities exposed by the agent, that can provide support to that user or tenant based on the contact information. Context-based routing system 112 thus includes engagement context information gathering system 184, engagement state identification system 186, problem identification system 188, support routing system 190, one or more processors or servers 192, and it can include a wide variety of other items 194.

Engagement context information gathering system 184 illustratively gathers not only server side context information indicative of the readiness and engagement of a given tenant, but it can also communicate with engagement sensing logic 166 in order to gather client side readiness and engagement information (such as the on-boarding stage or step and the velocity indicator). Based on that information, engagement state identification system 186 identifies a readiness state and an engagement state of the particular tenant for which the information was gathered.

Problem identification system 188 identifies problems in on-boarding or configuring a service, or in running a service, based upon the context information and based upon the engagement state. Support routing system 190 then routes the user (or tenant) having the issue to a given support agent 108-110. In doing so, it accesses capabilities exposed by the support agents 108-110 through capability exposure system 178. It matches the issue against the capabilities of the support agent, and then routes communication from the user (or tenant) with the issue to the identified support agent so that the user can obtain support from a qualified support agent. The capability exposure system 178 and support routing system 190 are described in greater detail below with respect to FIGS. 4A-4F.

Figure 2:
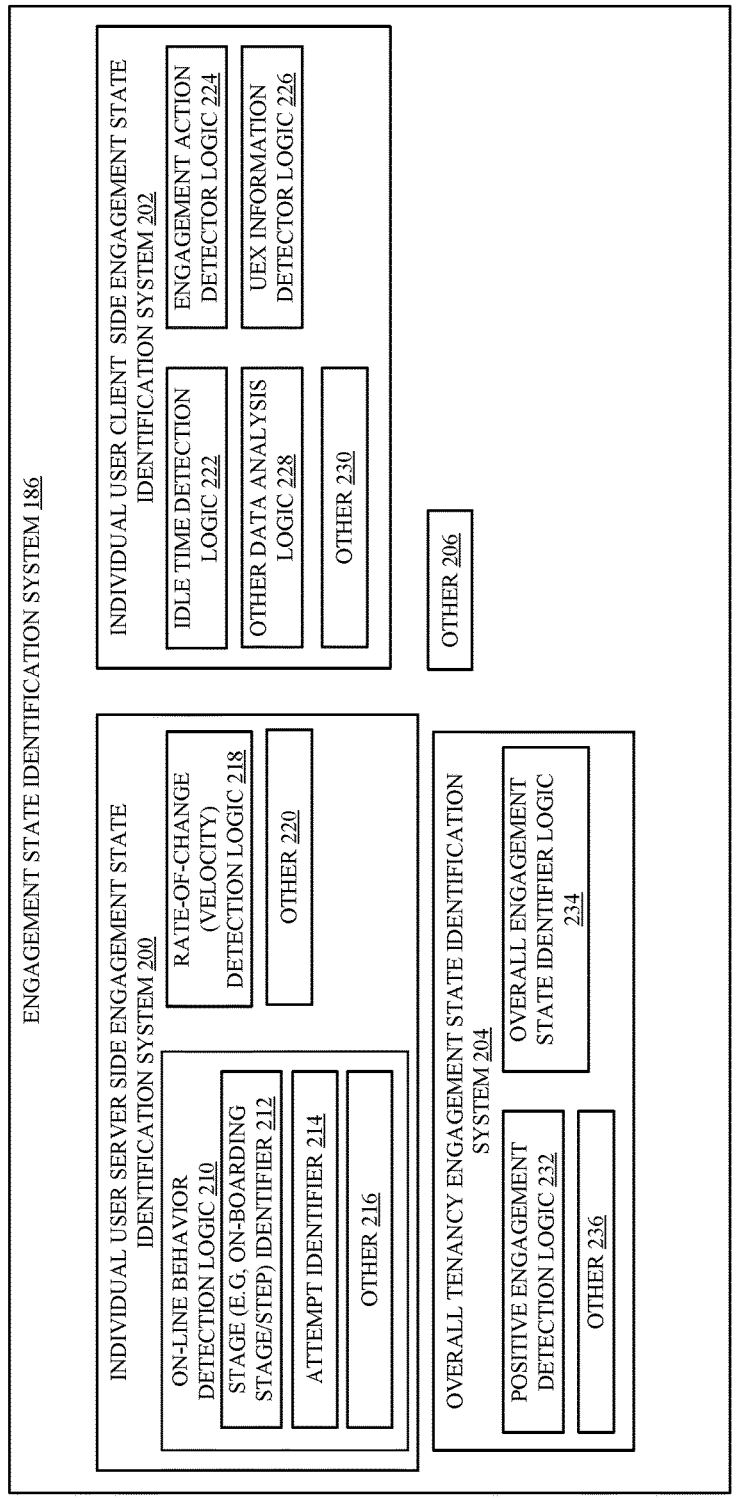
FIG. 2 is a more detailed block diagram of one example of an engagement state identification system.

Before describing the overall operation of architecture 100 in more detail, a brief description of some of the items shown in FIG. 1, and their corresponding operation, will first be provided. FIG. 2 shows a more detailed example of an engagement state identification system 186. System 186 illustratively includes an individual user, server side engagement state identification system 200, an individual user, client side engagement state identification system 202, and an overall tenancy engagement state identification system 204. It can include a wide variety of other items 206 as well.

The individual user, server side engagement state identification system 200 illustratively includes on-line behavior detection logic 210 which, itself, illustratively includes stage (e.g., on-boarding stage/step) identifier logic 212, attempt identifier logic 214, and it can include a wide variety of other items 216. System 200 also illustratively includes rate-of-change (e.g., velocity) detection logic 218 and it can include other items 220. Individual user, client side engagement state identification system 202 illustratively includes idle time detection logic 222, engagement action detector logic 224, user experience (UEX) information detector logic 226, other data analysis logic 228, and it can include other items 230. Overall tenancy engagement state identification system 204 illustratively includes positive engagement detection logic 232, overall engagement state identifier logic 234, and it can include other items 236.

Individual user, server side engagement state identification system 200 illustratively senses or detects various information indicative of server side activity of one or more individual users of a tenant. It then identifies a state of engagement and/or readiness (e.g., the on-boarding stage/step) of that individual user (or of that set of individual users). On-line behavior detection logic 210 detects the on-line behavior of the user in performing the on-boarding process. For instance, it may be that a user needs to perform a variety of different steps or tasks, in one or more stages, in order to have an on-line service fully setup and configured for use. By way of example, it may be that a tenant needs to go through a set of setup or configuration steps, such as establishing an entity record in the service, downloading and installing client components of the service, setting up domain name information, connecting the on-line service to the client components, and performing some type of data migration (such as migrating contacts, etc.), and then using the service. Each of these stages or steps may include a plurality of different steps or tasks as well. Attempt identifier 214 illustratively identifies attempts by a user to perform the steps or tasks for each of the stages or steps. It also illustratively identifies when a stage or step has been completed. Stage identifier 212 illustratively identifies the last stage or step that was completed by the user in attempting to perform the on-boarding process for the on-line service. Rate-of-change detection logic 218 detects how quickly the tenant is moving through the various stages or steps to become fully setup. By way of example, if the user performs all of the steps for the stage in setting up domain name information, but then takes an inordinately long amount of time to perform tasks in the stage (connecting the client components to the on-line service), stage identifier 212 will identify that the tenant has completed the first stage, but not the second stage. Attempt identifier 214 detects how many attempts the user has made to complete the second stage, and rate-of-change logic 218 will detect the velocity with which the user is moving through the stages or steps and generate a velocity indicator indicative of that. In this example, the velocity indicator will show that the user appears to be stuck on the second stage, because the last stage completed by the user has not changed in an unusually long time. The time can be measured against a threshold time value (or set of threshold values) for each stage or step, for different groups of stages or steps, for the on-boarding process as a whole, or it can be determined in other ways.

Individual user client side engagement stage identification system 202 illustratively performs the same types of analysis, except with respect to the user's activity on the client side, instead of on the server side. By way of example, the engagement sensing logic 166 on the client side (shown in FIG. 1) may provide information that can be operated on or analyzed by system 202 to help identify the current on-boarding stage or step, or the current state of readiness or engagement of the tenant. By way of example, assume that a setup wizard is provided to guide the user through the various stages in the on-boarding process, needed to setup the on-line service. Idle time detection logic 222 may detect how long it has been since the user attempted to setup (or complete setting up) the on-line service. UEX information detector logic 226 may illustratively detect whether the user has launched the setup wizard, whether the user has launched it multiple times, without finishing the setup, how far the user has made it through the setup wizard, etc. All of this and other information can be used to identify the on-boarding stage or step, or the stage of the engagement or readiness of the individual user, based upon the client side activity of that user.

Similarly, engagement action detector logic 224 illustratively detects engagement actions that are performed by the user. For instance, if the user is setting up an electronic mail (e-mail) service, and the user has attempted to send an e-mail, or receive and read an e-mail, etc., these actions can be detected by logic 224. All of this information can also be used, along with the information sensed by system 200, to identify an engagement stage of the tenant, and of individual users of the tenant.

Overall tenancy engagement state identification system 204 can use the information from systems 200 and 202, and other information, to determine an overall engagement state of a particular tenant. For instance, if no users at the tenant have ever used the service, then the engagement state may be "unengaged". If a single user has used the service, then the engagement state may be set to a first level, indicating that the tenant has successfully setup with the service, and at least one person has successfully used it. Other thresholds can be set for different percentages of the overall users at the tenant that are using the service. When the number of users using the service reaches those different thresholds, then the engagement state of the tenant can be increased to reflect that more individual users at the tenant are actually and positively engaged with the service.

In order to do so, positive engagement detection logic 232 can detect a number of individual users at a tenant (if any) that have had a positive engagement with the service. By positive engagement it is meant that the user has successfully used some aspect of the service. By way of example, if the service is an e-mail service, a positive engagement would be that a user has successfully sent or received an e-mail. Overall engagement state identifier logic 234 identifies the overall engagement state of the tenant, based upon the users who have had a positive engagement with the service.

It can set the overall engagement state of the tenant by comparing the number of users (or percent of the users or other measure of the users) of a tenant that have had a positive engagement against threshold values. It can also set the engagement state based upon the complexity of the engagement operations that have been performed by a user. By way of the above example, where the service is an e-mail service, if a user has sent an e-mail, that may correspond to a first engagement state. However, if the user has created multiple folders in the e-mail system, or successfully attached an attachment to an e-mail, or performed other actions, those actions are more complex, and may thus correspond to one or more different engagement states. All of these and other options are contemplated herein.

Figure 3:
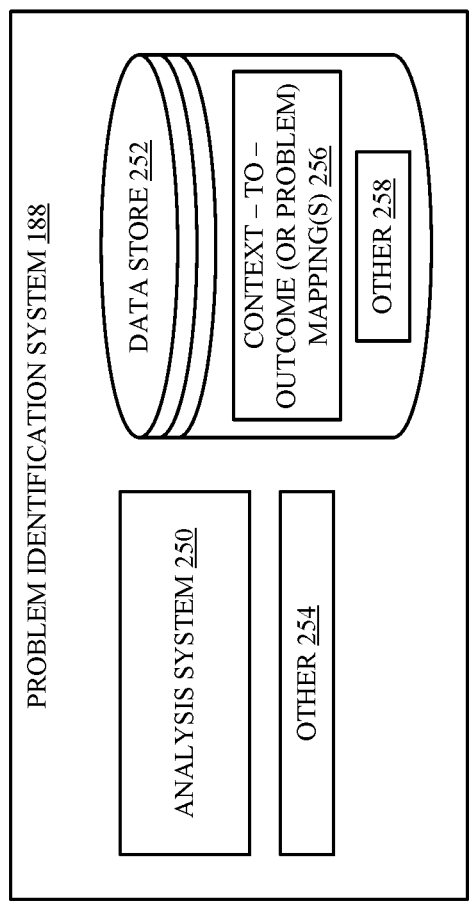
FIG. 3 is a more detailed block diagram of one example of a problem identification system.

FIG. 3 is a block diagram showing one example of problem identification system 188 (shown in FIG. 1) in more detail. In one example, problem identification system 188 includes analysis system 250 that analyzes the on-boarding stage or step, the velocity indicator, and any identified engagement stage and context information. System 188 also includes data store 252, and it can include a wide variety of other items 254. Data store 252 illustratively includes context-to-outcome (or problem) mappings 256. Mappings 256 illustratively map the context information of a particular tenant (e.g., the stage or step identifier and the velocity indicator and/or other information) to a likely problem that the tenant is having or a likely outcome as to whether the tenant will successfully complete the on-boarding process and setup and engage with a service. In one example, mappings 256 are generated based on historical information collected from a plurality of other tenants, and users.

Analysis system 250 illustratively receives the various context information gathered by engagement context information gathering system 184 and also receives the various on-boarding stage or step and velocity information, and engagement state information identified by engagement state identification system 186 and generates a set of overall context information. It then accesses data store 252 and correlates that overall context information to a likely outcome for the corresponding tenant, or to a likely problem that the corresponding tenant is having. System 188 can then output this information to support routing system 190 (shown in FIG. 1) that can route a user of the corresponding tenant to a particular support agent 108-110 based upon the capabilities exposed by support agents 108-110.

Therefore, in one example, support routing system 190 can route the tenant to a support agent that is capable of addressing the issues or problems encountered by that tenant, in completing the on-boarding process quickly and without transferring the tenant to a different support agent. This is because the support agent will be pre-qualified to handle the particular issue encountered by the tenant, based upon the capabilities that they have exposed through capability exposure system 178. System 112, having identified the likely issues or problems being encountered by the tenant, can then identify a support agent that is suitable to address those issues or problems.

Signal exposure system 119 can include programming interface logic 125, signal acquisition logic 127 and other items 129. Programming interface logic 127 exposes signal acquisition API 121 with various methods that can be invoked (or called) by third party system(s) 123 in order to obtain any or all of the various tenant engagement information generated by any or all of systems 102, 112, 114, 118, 120, 124, 126 and/or 128, or other systems in architecture 100. This information is referred to herein as a set of tenant engagement signals. Programming interface logic 125 processes those calls, and signal acquisition logic 127 interacts with the various systems in architecture 100 to obtain the requested information, which is then returned to third party system(s) 123 through API 121.

Figure 4:
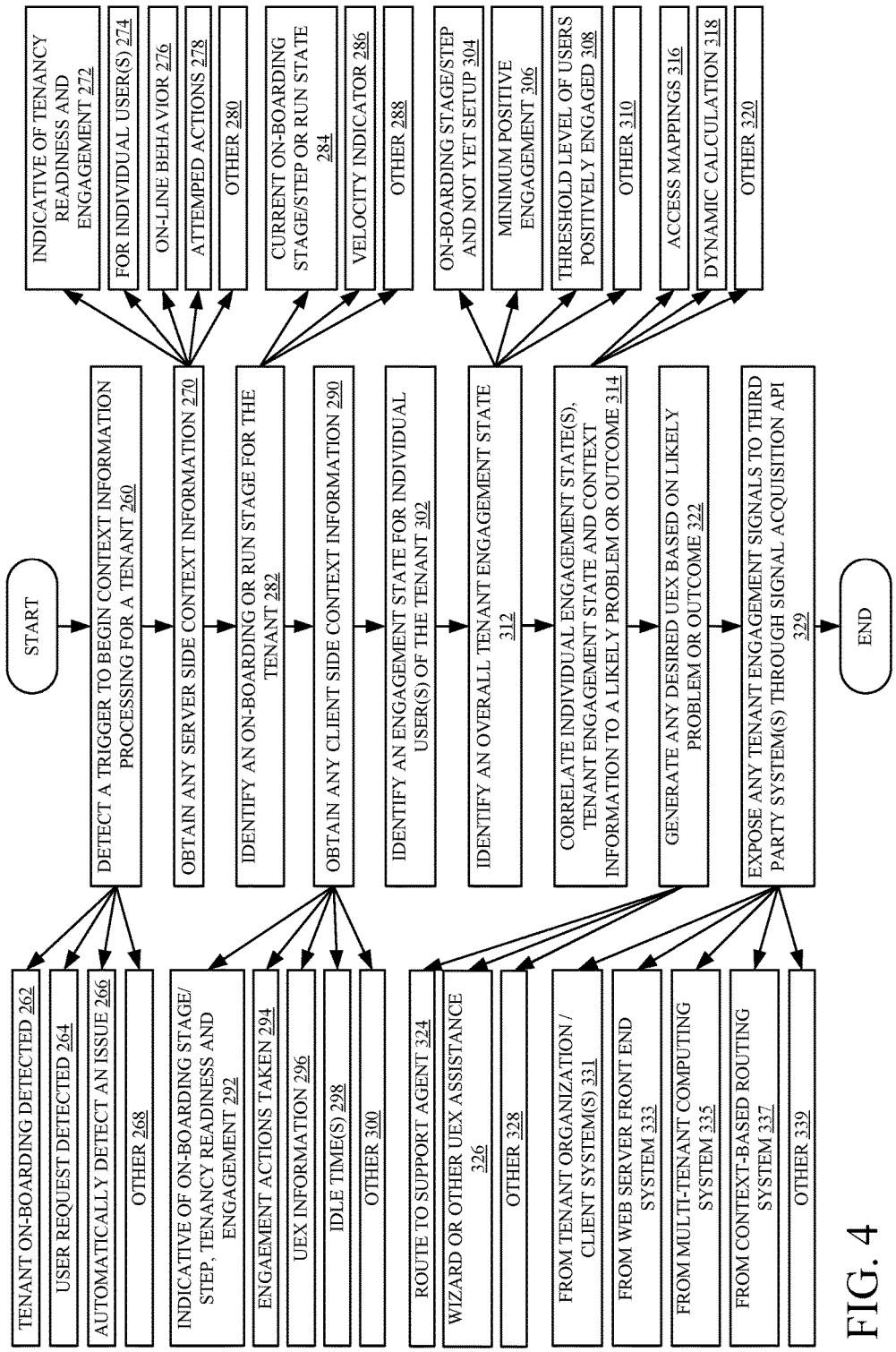
FIG. 4 is a flow diagram illustrating one example of the operation of the architecture shown in FIG. 1, in identifying an engagement state of a tenant in a multi-tenant architecture.

FIG. 4 is a flow diagram illustrating one example of the operation of the architecture shown in FIG. 1, in identifying on-boarding stage/step, velocity and context information and an engagement state of a tenant, correlating that to a likely problem or outcome for the tenant, and then performing any user experience (UEX) operations based upon the estimated outcome or problems. Context-based routing system 112 first detects a trigger indicating that it should begin context information processing for a tenant. This is indicated by block 260 in FIG. 4. There are a wide variety of different types of triggers that can be used to begin this processing. For instance, it may be that system 112 detects that a tenant has purchased a subscription for an on-line service and is attempting the on-boarding process to configure this service for use. This is indicated by block 262. It may be that a user at a tenant is requesting help or assistance in addressing an issue. This is indicated by block 264. It may be that system 112 automatically detects that a user or tenant is encountering an issue or problem in either setting up a service or in using it. This is indicated by block 266. The triggers can be a wide variety of other triggers as well, and this is indicated by block 268.

Once it has been triggered, engagement context information gathering system 184 (or system 200 shown in FIG. 2) obtains any server side context information that may exist for the tenant. This is indicated by block 270. For instance, it may be context information, as discussed above, that is indicative of the tenancy readiness and engagement with a service that the tenant is attempting to setup and use. This is indicated by block 272. It may be context information for one or more individual users of a tenant, as indicated by block 274. It may be information indicative of on-line behavior of the users or of the tenant as a whole, as indicated by block 276. The context information may identify attempted actions, that one or more users of the tenant has attempted to perform in order to setup or positively engage with the service. This is indicated by block 278. It may include a wide variety of other server side context information as well, and this is indicated by block 280.

System 184 then identifies an onboarding or run stage or step for the tenant. This is indicated by block 282. For instance, this can include a current stage or step the tenant is on in the on-boarding process or the run state of the tenant as indicated by block 284. It can also include a velocity indicator indicative of a rate-of-change of the stages, steps or states that the tenant is going through. This is indicated by block 286. It can also include a wide variety of other information, as indicated by block 288.

System 184 (or system 202 shown in FIG. 2) then obtains any client side stage, step, or other context information. This is indicated by block 290. This can be information indicative of the tenancy on-boarding stage or step, the tenancy readiness and engagement with the service, as indicated by block 292. It can include an identification of any engagement actions that have been taken as indicated by block 294. It can include user experience (UEX) information 296, such as information indicating whether the user has successfully advanced through a setup wizard or other user experiences that may give an indication of readiness or engagement. The context information can include idle times 298 that indicate how long a user has been on a page of a multi-step wizard, how long the user has been at a certain stage or step in the on-boarding or setup process, etc. The client side context information can include a wide variety of other information 300 as well.

Engagement state identification system 186 then identifies an engagement state for one or more individual users of the tenant, based on the context information. This is indicated by block 302. The state may indicate where the user is in the on-boarding process, and that the service is not setup yet, as indicated by block 304. It may be a state of minimum positive engagement, such as when a single user or small group of users at the tenant has successfully used the service. This is indicated by block 306. It may be a higher state of engagement where the positive engagements by the users of the tenant exceed various different thresholds. This is indicated by block 308. The state of engagement of the individual users can be identified in other ways as well, and this is indicated by block 310.

Based upon the on-boarding and velocity information, the context information and engagement states of individual users of the tenant, overall tenancy engagement state identification system 204 then identifies an overall tenant engagement state for the tenant. Of course, this can be done based on other context information as well. This is indicated by block 312.

Analysis system 250 (in problem identification system 188 in FIG. 3) then correlates the individual user engagement states, the overall tenant engagement state, and the other on-boarding, velocity and context information, to a likely problem that is being encountered by the tenant. This is indicated by block 314. In doing so, system 250 can access the context-to-outcome (or problem) mappings 256. This is indicated by block 316. The correlation can also be based upon a dynamic calculation, instead of predefined mappings. This is indicated by block 318. The correlation can be performed in other ways as well, and this is indicated by block 320.

Once the engagement state (e.g., the on-boarding stage/step or runtime state) is known, and once any issues or problems are identified, system 112 can perform any desired processing actions, or conduct any desired user experience (UEX). This is indicated by block 322. For instance, support routing system 190 can route the tenant to a support agent 108-110. This is indicated by block 324. System 112 can also surface a wizard or other UEX for a user of the tenant that can guide the user to address any identified issues or problems. This is indicated by block 326. A wide variety of other processing can be performed as well, based upon the state of engagement and any likely problems or outcomes, once they have been identified. This is indicated by block 328.

At any point during the above processing, any of the tenant engagement signals can be exposed to third party system(s) 123 through signal acquisition API 121. This is indicated by block 329. For instance, any of the information generated by a tenant organization 118 or any of the client systems 120, 124, 126 and/or 128 can be exposed through API 121. This is indicated by block 331. Information detected or generated by web server front end system 114 or multi-tenant computing system 102 can be exposed through API 121. This is indicated by blocks 333 and 335. Further, information detected or generated by context-based routing system 112 or other systems in architecture 100, or elsewhere, can be exposed through API 121. This is indicated by blocks 335 and 337. Third party system(s) 123 can perform any of a wide variety of different functions based on the exposed tenant engagement signals, and some of these are described below with respect to FIGS. 9-11.

Figure 4B:
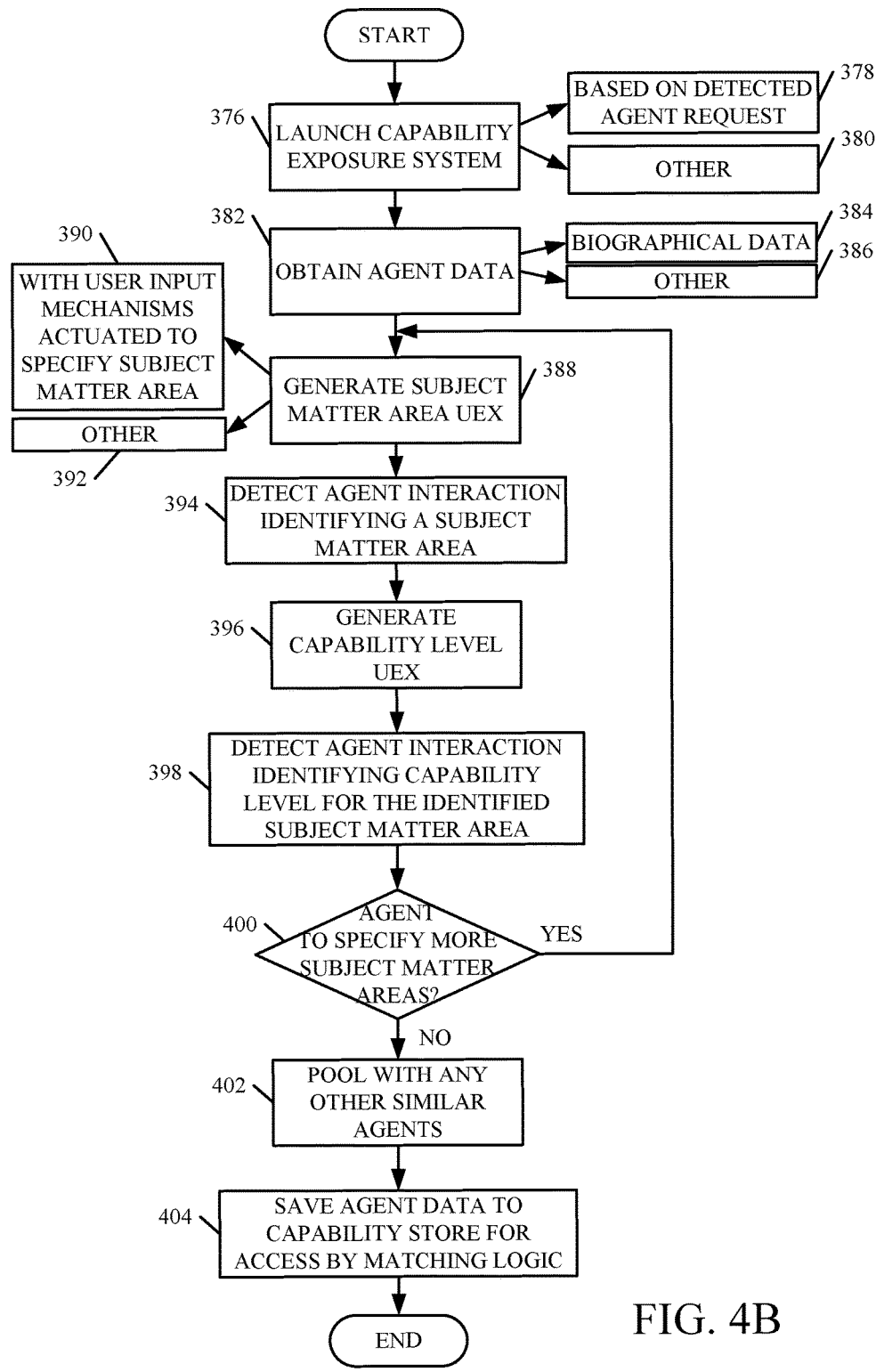
FIG. 4B is a flow diagram illustrating one example of the operation of the capability exposure system.

FIG. 4A shows one example of a more detailed block diagram of capability exposure system 178. System 178 illustratively includes subject matter area exposure logic 370, capability level exposure logic 372 and it can include other items 374. Subject matter area exposure logic 370 illustratively generates a user experience (which can include user interfaces and corresponding functionality) that allow an agent to enter his or her capabilities in various different subject matter areas. Capability level exposure logic 372 illustratively generates a user experience that allows the agent to enter his or her capability level with respect to the different subject matter areas identified using logic 370. FIG. 4B is a flow diagram illustrating one example of the operation of capability exposure system 178 in more detail.

In one example, a support agent (the description will proceed with respect to support agent 108 using system 104) launches capability exposure system 178 so that he or she can enter different capabilities to be exposed by support agent system 104 to context-based routing system 112. Launching the capability exposure system 178 is indicated by block 376 in FIG. 4B. The agent can do this by providing an express request as indicated by block 378, or in other ways, as indicated by block 380.

System 178 then obtains some basic agent data that may have already been entered by agent 108. In another example, system 178 prompts the agent 108 to enter that data. This is indicated by block 382. The agent data can include biographical data 384 (which may be obtained, for instance, from a profile or other place), and it can include a wide variety of other information 386.

Subject matter area exposure logic 370 then generates a subject matter area user experience (or UEX). This is indicated by block 388. The UEX can include user interfaces that have user input mechanisms that can be actuated to specify one or more different subject matter areas. This is indicated by block 390. For instance, it may be that the subject matter area UEX generates a user interface display with a drop down menu that displays various selectable subject matter areas. In another example, the user input mechanisms can include devices for browsing and selecting different subject matter areas, or for entering customized subject matter areas. All of these and other architectures are contemplated herein. The subject matter area UEX can include other items 392 as well.

Logic 370 then detects agent interaction with the elements of the UEX, which identify a particular subject matter area. This is indicated by block 394.

Once a subject matter area has been identified by the agent, then capability level exposure logic 372 generates a capability level user experience. This is indicated by block 396. Again, the capability level UEX can have user interface displays with user input mechanisms that allow the agent to select, describe, or otherwise identify his or her particular capabilities in the selected subject matter area. The capabilities can be identified in a wide variety of different ways as well. For instance, the capabilities may be categorized into different levels of experience or expertise that an agent has with respect to the identified subject matter area. By way of example, the agent may be able to indicate that he or she is an "expert", a "specialist", a "generalist", etc., with respect to the identified subject matter area. In another example, the agent may be able to rate his or her own expertise or knowledge with respect to that subject matter area, using an alphanumeric rating scale, or in other ways. Similarly, the agent may be able to enter a textual description, links, or other indications of his or her capabilities with respect to the identified subject matter area. All of these are contemplated herein.

Capability level exposure logic 372 then detects the agent interaction identifying the capability level for the identified subject matter area. This is indicated by block 398.

Capability exposure system 178 is, in one example, configured to allow an agent to enter capabilities for multiple different subject matter areas, either at the same time, or sequentially. Thus, at block 400, system 178 determines whether the agent is to specify any more subject matter areas or to enter any more capability information. If so, processing reverts to block 388.

If, at block 400, it is determined that the agent has finished entering capability information, then capability exposure system 178 can pool this particular agent with any other similar agents, based upon the capability information that was entered. This is indicated by block 402. By way of example, it may be that the various different agents 108-110 are grouped based on similar capabilities. Thus, when a call is received for assistance in a particular subject matter area, an agent from that pool can be selected, based on their availability, based upon their reputation, based upon the capability level, etc. This is described in greater detail below.

Once the agent has been pooled (if that is desired) then the agent data is saved to a capability data store, such as that described below with respect to FIG. 4D, so it can be accessed by matching logic in system 190. Saving the agent data for access by the matching logic in support routing system 190 is indicated by block 404 in FIG. 4B.

Figure 4C:
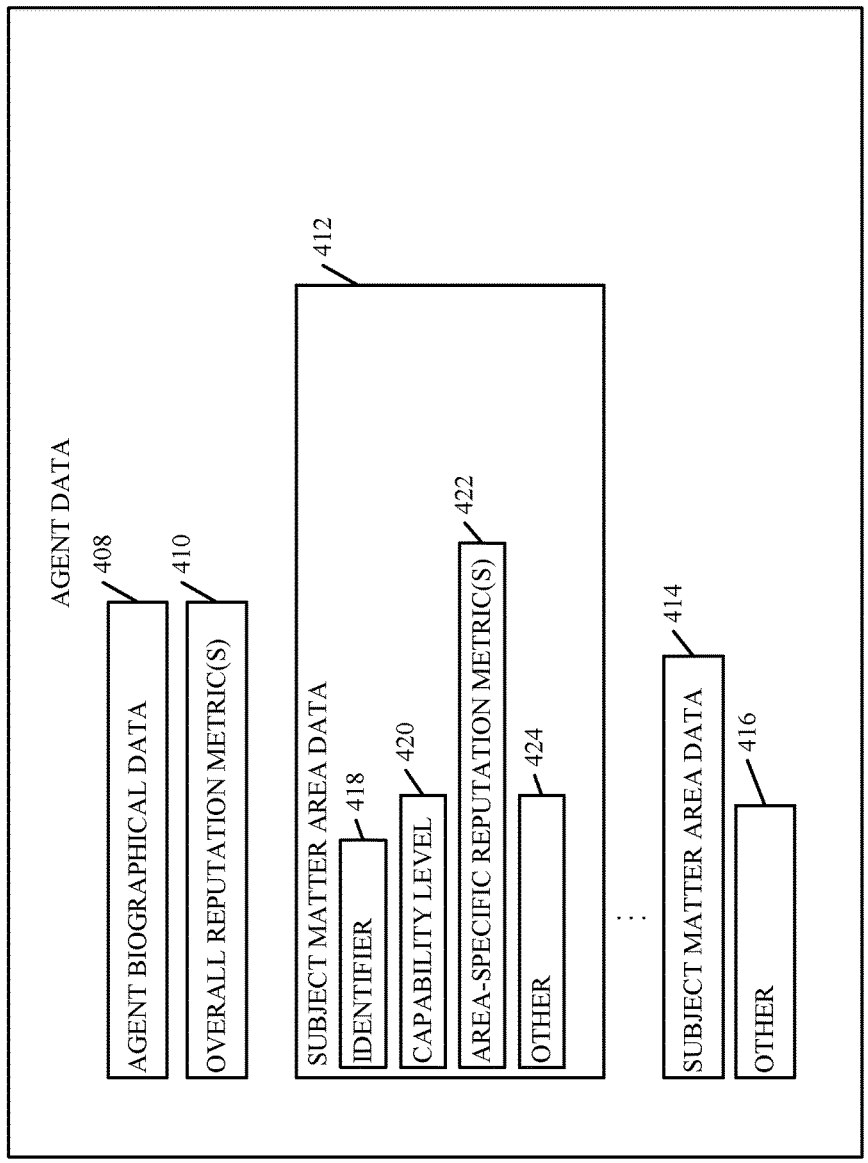
FIG. 4C shows one example of agent data.

FIG. 4C is a block diagram showing one example of agent data 406 that can be generated and exposed by an agent (such as being stored for access by support routing system 190). In one example, agent data 406 includes agent biographical data 408, one or more overall reputation metrics 410 that can be generated (as described in greater detail below) by users who have used this particular agent to resolve problems. Agent data 406 can also include subject matter area data 412-414 for a variety of different subject matter areas. Data 406 can include a wide variety of other information 416 as well.

For each subject matter area, the corresponding data illustratively includes a subject matter area identifier 418, capability level 420, one or more area-specific reputation metrics 422, and it can include other items 424. Identifier 418 illustratively identifies the particular subject matter area that data 412 corresponds to. Capability level 420 illustratively includes the capability level information entered by the corresponding agent, for this subject matter area. Area-specific reputation metrics 422 illustratively identify the reputation of this particular agent (among users) for this particular subject matter area. Agent data 406 can thus be used by support routing system 190 to identify a particular agent that has capabilities and a reputation with respect to a particular subject matter area, so that the agent can be used to help a user resolve an issue in that particular subject matter area. All of this information is described by way of example only.

Figure 4D:
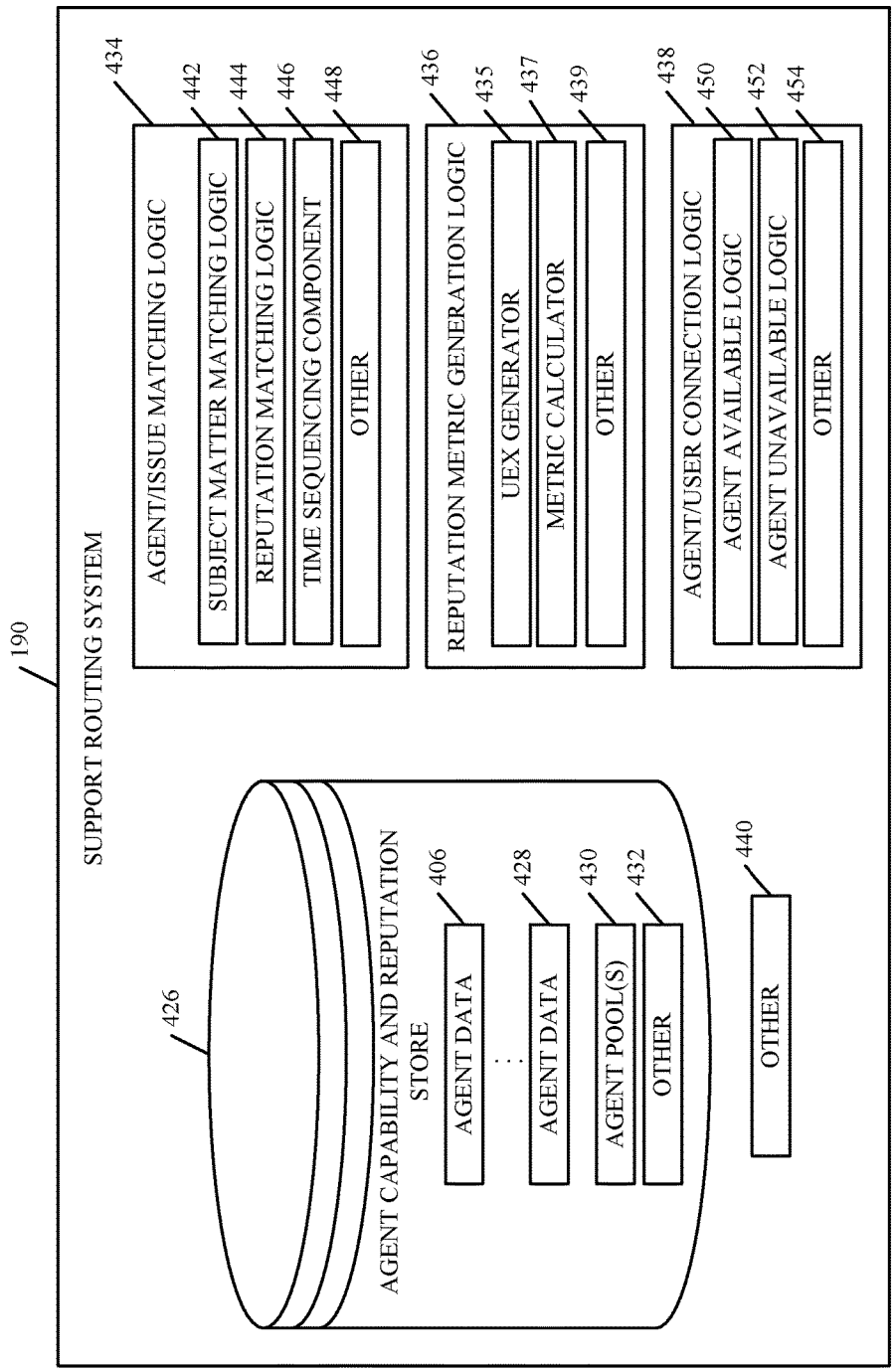
FIG. 4D is a more detailed block diagram of one example of a support routing system.

FIG. 4D is a more detailed block diagram of one example of support routing system 190. In the example shown in FIG. 4D, system 190 illustratively includes agent capability and reputation store 426. It will be noted that store 426 can be located substantially anywhere in the architecture 100, shown in FIG. 1, or in other locations as well. It is shown and described as being part of support routing system 190 for the sake of example only.

Store 426 illustratively includes the agent data 406-428, for various different agents 408-410. It can also include the agent pools 430 described above. Of course, it can include a wide variety of other items 432 as well.

System 190 also illustratively includes agent/issue matching logic 434, reputation metric generation logic 436, agent/user connection logic 438, and it can include a wide variety of other items 440. Agent/issue matching logic 434 illustratively includes subject matter matching logic 442, reputation matching logic 444, time sequencing component 446, and it can include other items 448. Agent/user connection logic 438 illustratively includes agent available logic 450, agent unavailable logic 452, and it can include other items 454. Before describing the operation of system 190 in more detail, a brief description of some of the items in system 190 will first be provided.

Subject matter matching logic 442 illustratively receives the issue identified by problem identification system 188 (and it can receive other information as well), and accesses agent capability and reputation store 426 to identify an agent that can be used to address the identified issue. In doing so, it may first access agent pools 430 to identify a pool of agents that have sufficient capabilities to address the issue. It may then access the individual agent data 406-428 for the agents in that pool to identify a particular agent that may be used to address the issue, based upon the agent's capabilities. Similarly, reputation matching logic 444 may access the agent data 406-428 or the agent pools 430, or both, to identify an agent that has a reputation that indicates that the agent may be reliable in addressing the user's issue. Time sequencing component 446 illustratively keeps track of the time (such as using timestamps) that the customer's issue is received, and the timeliness with which the agent responds to a notification, and responds to the user in addressing the issue.

Agent/user connection logic 438 illustratively connects the user that submitted the issue to the selected support agent. Agent available logic 450 illustratively generates one connection user experience (UEX) if an agent is immediately available to address the user's issue. Agent unavailable logic 452 illustratively generates another user experience (UEX) if an agent is not immediately available. In one example, for instance, logic 450 generates a UEX that allows the user to have instant communication with an agent (such as through a telephone or cellular phone call, such as through instant messaging, etc.). Logic 452, on the other hand, provides for communication using a delayed response, such as using electronic mail (e-mail), or such as generating suitable messages indicating that an agent will contact the user within a suitable time period, given that no agent is currently available to assist the user.

Reputation metric generation logic 436 illustratively generates a user experience that allows a user to provide feedback with respect to the agent. In one example, the feedback can be for a plurality of different service areas (such as competency, timeliness, courtesy, etc.). In another example, an overall reputation metric can be generated as well, which indicates the user's overall satisfaction with this particular agent. All of this is described in greater detail below.

Figure 4E:
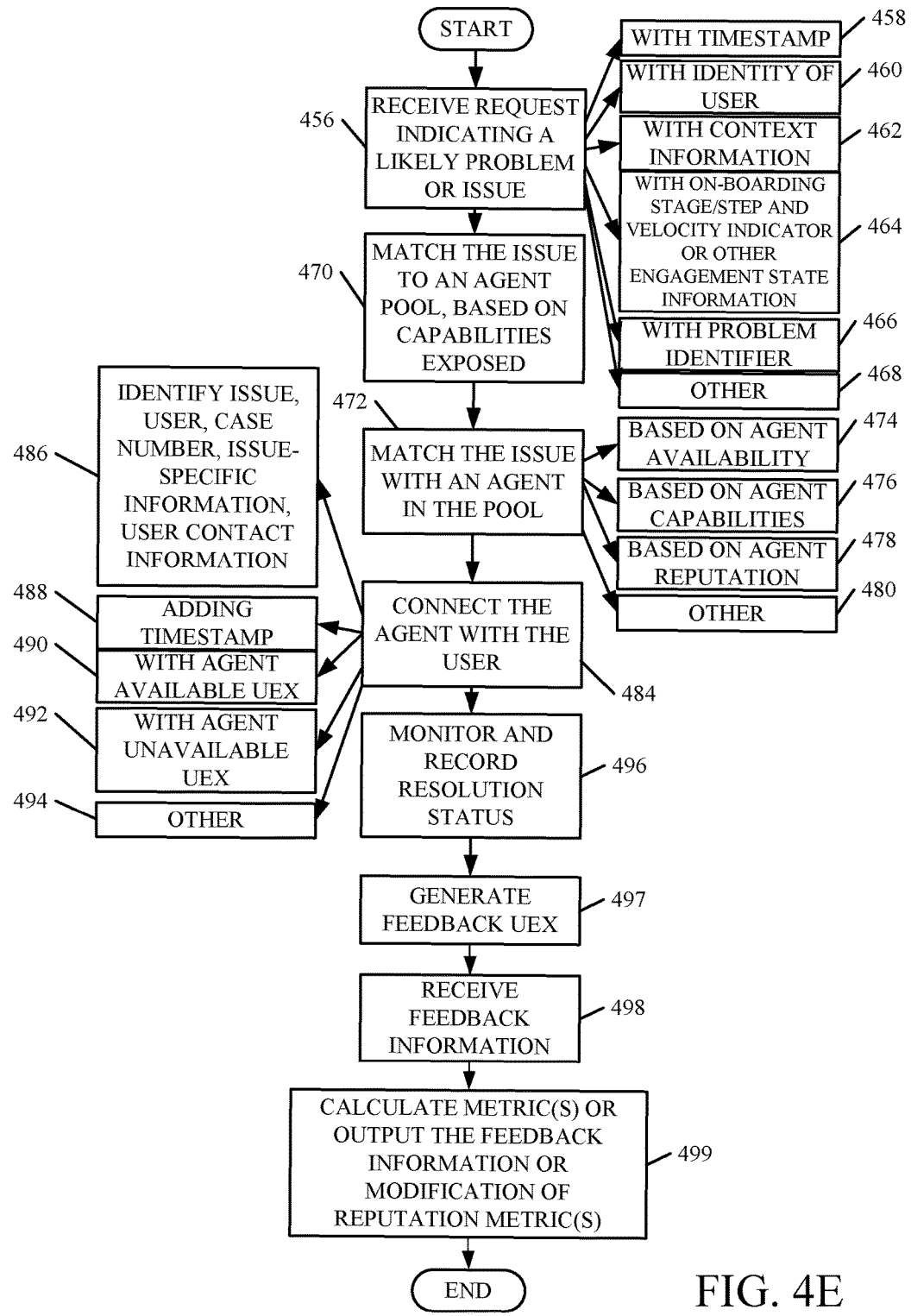
FIG. 4E is a flow diagram showing one example of the operation of the support routing system.

FIG. 4E is a flow diagram illustrating one example of the operation of support routing system 190 in receiving a request indicating that a user has an issue, connecting the user to a particular agent, and handling feedback from the user based upon his or her interaction with the agent.

In doing so, system 190 (or other items in architecture 100) can track a variety of different things. For instance, when a request is generated by a user for support from an agent, agent/user connection logic 438 can track a number of different things. It can generate a timestamp on the request when the user first submits the request (such as by clicking "Help" on a user interface display). It can track the number of times that a request gets put into a queue for response by an agent, and the time that the request spends in each queue. It can track the number of times the request has been accepted by an agent and the number of times it has been declined. It can track the number of times the request has timed out. In addition, it can track other information about individual agents. For instance, it can track the percent of accepted requests in which the agent actually makes contact with the user and the percent of requests for which both the agent and the user confirm resolution. It can also calculate the total lifetime of a request, which may be calculated as the time that the request was resolved minus the time that the request was generated (both times being represented by timestamps).

The system can track aggregate request data as well. This can include, for instance, the success rate of agents in resolving requests, the number of times (or percentage) where the agent confirms that an issue is resolved but the user does not, and the number or percentage of requests that go unresolved (whether by the agent or the user). The average time for resolving a request can be calculated, and the reasons that a request is not resolved may also be obtained and logged.

In addition, the client side engagement sensing logic 166, or context-based routing system 112, or a combination of both of them, can track data from users as well. For instance, the amount of time between a page load that a user is working on, and the time that the user requests help may be tracked. Also, the systems can track the number of times that a user cancels a request and the feedback indicating how happy a user is immediately after the issue is resolved. The wait time (which can be calculated as the time that the system contacts an agent minus the time that the user requested help) can be tracked, and the amount of time any given agent has spent on a request can also be tracked.

Further, the capability exposure system 178, or context-based routing system 112 (or a combination of both of them) can also track additional information about agents. For instance, it can track the total number of requests sent to each individual agent (and whether they were accepted or rejected). It can track the time when an agent is notified about a request and the time between when an agent accepts a request and when the agent contacts a user. It can also track the number or percentage of requests that were sent to a given agent, and accepted by that agent, where the agent does not contact the user. It can also track the number or percent of requests that the agent identifies as resolved. In addition, reputation metric generation logic 436 can also generate reputation scores, or capability information based on the number of specific scoped tasks that a given agent accepts and resolves. All of these items of information are given by way of example only. Some of them will be described in greater detail below.

Referring again to the flow diagram of FIG. 4E, agent/issue matching logic 434 first receives a request indicating a likely problem or issue. This is indicated by block 456 in FIG. 4E. The request can include a timestamp indicating the time when the issue was automatically and proactively detected by problem identification system 188 (e.g., even before receiving a user help request corresponding to the issue) or when the user first indicated that he or she was having an issue. It can include timestamps for other items as well, such as when it was received by agent/issue matching logic 434, or other time periods. This is indicated by block 458. The request can include the identity of the particular user 130-132 which indicated he or she is having a problem. This is indicated by block 460. It can also include the context information generated by engagement context information gathering system 134. This is indicated by block 462. It can include the on-boarding stage/step and velocity indicator and/or other engagement state identified by engagement state identification system 186. This is indicated by block 464. It can include the problem identifier generated by problem identification system 188. This is indicated by block 466. It can include a wide variety of other information as well, as indicated by block 468.

Subject matter matching logic 442 then matches the issue to an agent pool 430, based upon the capabilities exposed by the agents in the various pools 430. This is indicated by block 470. This can take a wide variety of different forms. For instance, it may be that the problem identifier that is received identifies the problem and this corresponds to the subject matter area identifiers 418 in the agent data 406. It may also correspond to a pool identifier that identifies the individual agent pools 430. Matching the issue against a pool of agents that are capable of handling the issue can be done in a wide variety of other ways as well.

Logic 442 then matches the issue with one or more individual agents in the identified pool. This is indicated by block 472. The matching step 472 can be performed by both subject matter matching logic 442 and reputation matching logic 444. In doing so, these components not only take into account the availability 474 of the agents and the capabilities 476 of the agents in the various identified pools (if a pool was identified), but it also accounts for the reputation 478 of those agents. In one example, the reputation metrics can be alphanumeric metrics and a variety of different thresholds can be set. The agents with the reputation metrics that exceed the highest threshold might first be selected (and they can be based on criteria such as their individual capabilities, their availability, the cost of using them, etc.) and then agents that surpass the second highest threshold might be selected, and so on. Of course, this is only one way of matching the issue with a given agent and other ways 480 can be used as well.

Once a particular agent is identified, then agent/user connection logic 438 connects the identified agent with the user. This is indicated by block 484, and it can be done in a wide variety of different ways. In one example, the agent is notified with a notification that includes an issue identifier that identifies the issue, a user identifier that identifies the user, a case number, any issue-specific information, and user contact information. This is indicated by block 486. The notification can also include a timestamp as indicated by block 488.

When the agent is available, then agent available logic 450 generates a user experience that is specific to a currently available agent. This is indicated by block 490. When the agent is unavailable, then agent unavailable logic 452 generates a user experience that is specific to an agent that is not immediately available. This is indicated by block 492. Some aspects of these user experiences are described below with respect to the user interface displays shown in FIGS. 5A-8B. The agent can be connected with the users in other ways as well, and this is indicated by block 494.

Time sequencing component 446 illustratively monitors and records a resolution status for the issue, as the agent and user are interacting with one another. This is indicated by block 496. In doing so, it can apply timestamps to information, indicating when various things occurred (such as how quickly the agent accepted the issue notification and agreed to address the issue with the user, how soon the agent contacted the user, how soon the agent responded to communications by the user, whether the issue was eventually resolved, etc.).

Reputation metric generation logic 436 illustratively includes UEX generator 435 that generates a user experience that allows the user to enter feedback with respect to the agent. Generating the feedback UEX is indicated by block 497.

Metric calculator 437 then receives the feedback information and can either calculate or modify the various reputation metrics or output the feedback information for calculation or modification of the reputation metrics by another system. Receiving the feedback information is indicated by block 498 and calculating the metrics or outputting it for metric calculation is indicated by block 499.

Figure 4F:
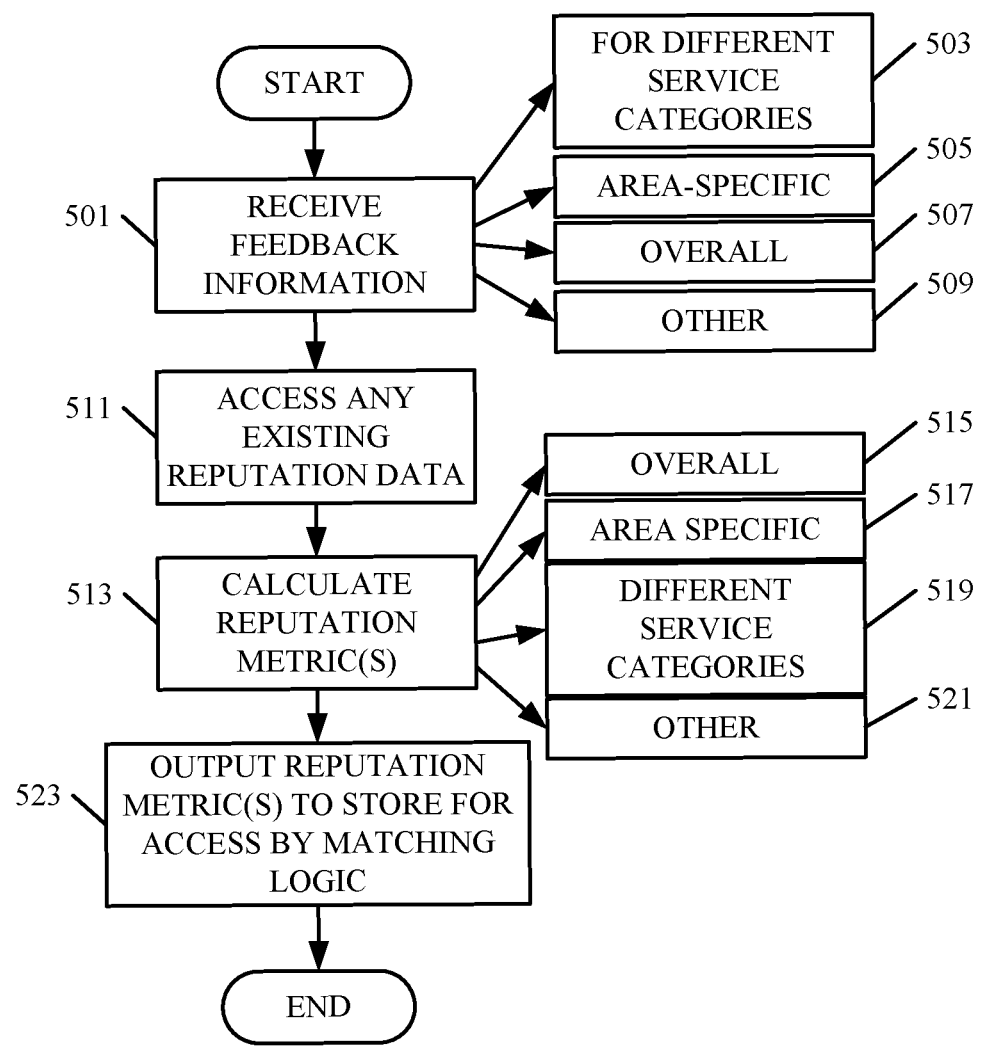
FIG. 4F is a flow diagram showing one example of the operation of reputation metric generation logic.

FIG. 4F is a flow diagram illustrating one example of the operation of metric calculator 437 in calculating one or more reputation metrics for a given agent, based upon feedback information. Calculator 437 first receives the feedback information, as indicated by block 501. The feedback information can be for one or more different service categories (such as competency, courtesy, timeliness, etc.). This is indicated by block 503. It can be area-specific feedback information (such as how the agent performed in resolving an issue in a particular subject matter area). This is indicated by block 505. It can also be overall feedback information indicating the overall satisfaction of a user in using this particular agent. This is indicated by block 507. It can include a wide variety of other feedback information 509 as well.

Metric calculator 437 then accesses any already-existing reputation information (such as an already existing overall reputation metric 410 or any already-existing area-specific reputation metrics 422) for this user. This is indicated by block 511. Calculator 437 then calculates one or more reputation metrics based upon the newly received feedback information. This is indicated by block 513.

For instance, if no already-existing metrics are available for this agent, then it can calculate one or more reputation metrics for this agent, based upon the feedback information from the user. If already-existing reputation metrics exist, then it can recalculate or modify those reputation metrics, based upon the newly received feedback information. The reputation metrics, again, can be an overall reputation metric 515, area-specific metrics 517, they can be for different service categories (such as timeliness, courtesy, competency, etc.) 519, or they can be other reputation metrics 521.

Calculator 437 then outputs the reputation metrics so that they can be stored in agent capability and reputation store 426, for this particular agent. This is indicated by block 523. The new (or updated) reputation metrics can then be accessed by reputation matching logic 444 for matching this particular agent with other users when future issues are identified.

Figure 5A:
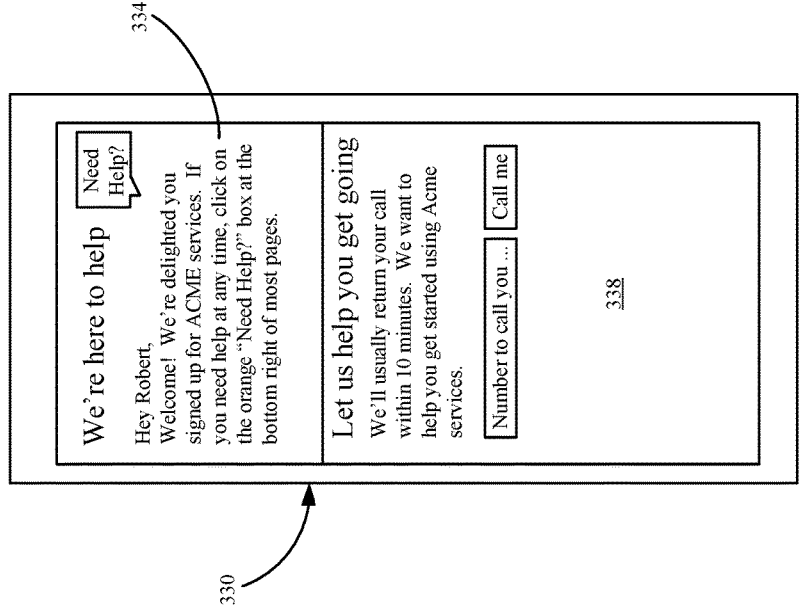
FIGS. 5A and 5B show examples of user interface displays.
Figure 5B:
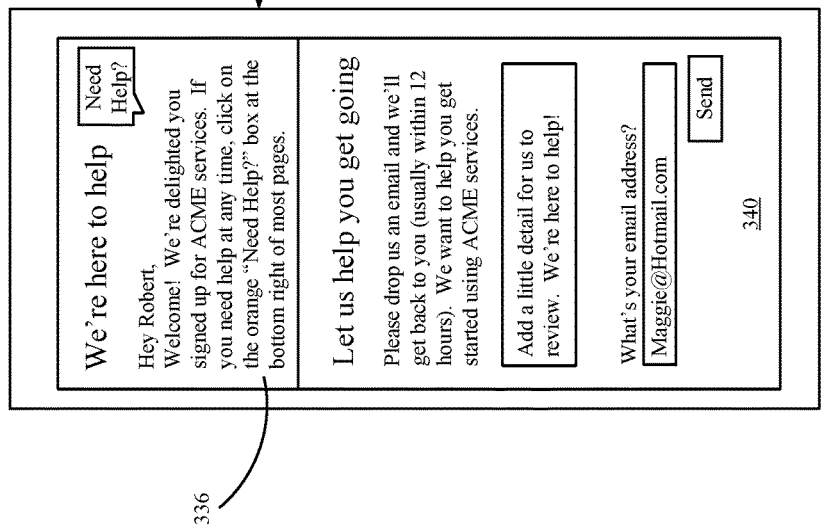

FIGS. 5A and 5B show two examples of user interface displays 330 and 332, respectively, that can be generated by context-based routing system 112 in response to being triggered. FIGS. 5A and 5B are illustratively generated during the onboarding processes when a tenant is attempting to setup or otherwise configure a service. This can be automatically and proactively detected, when the system identifies that the tenant is encountering an issue or it can be detected by the tenant requesting help or based on another user input. The user interface display 330 may be generated by agent available logic 450 when a support agent is available, and user interface display 332 may be generated by agent unavailable logic 452 when a support agent is not currently available. It can be seen that both displays include a greeting portion 334-336. Also, they each include a communication portion 338, 340. The communication portions 338-340 allow the user to enter a telephone number (where an agent is available) or other contact information (where an agent is unavailable). Portion 340 also allows a user to enter descriptive material describing the nature of the problem.

Figure 6A:
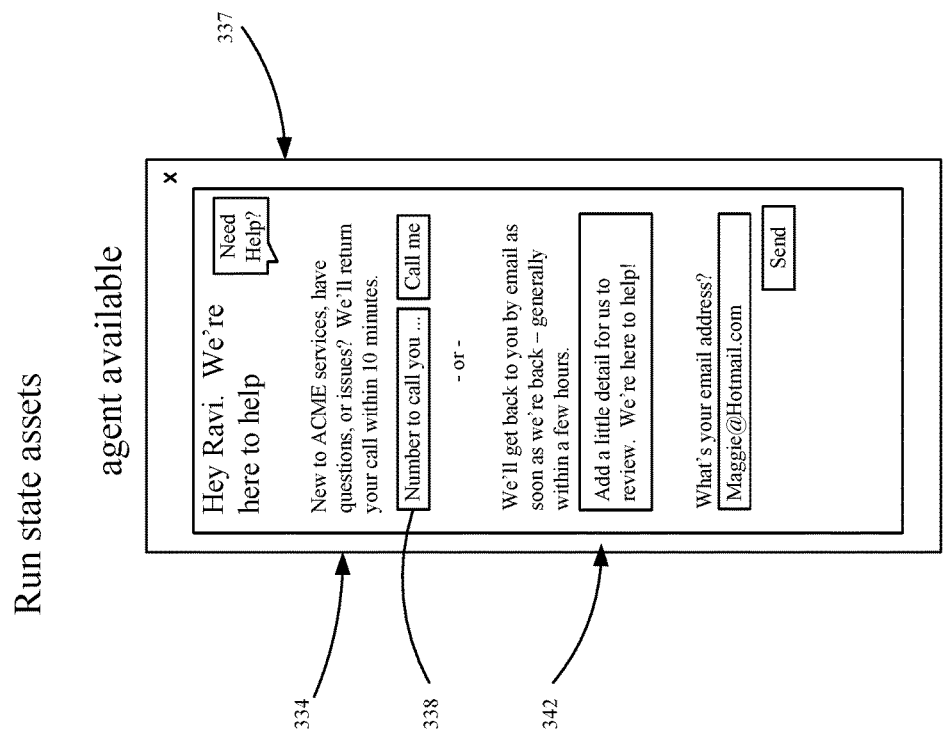
FIGS. 6A-6C show examples of user interface displays.
Figure 6B:
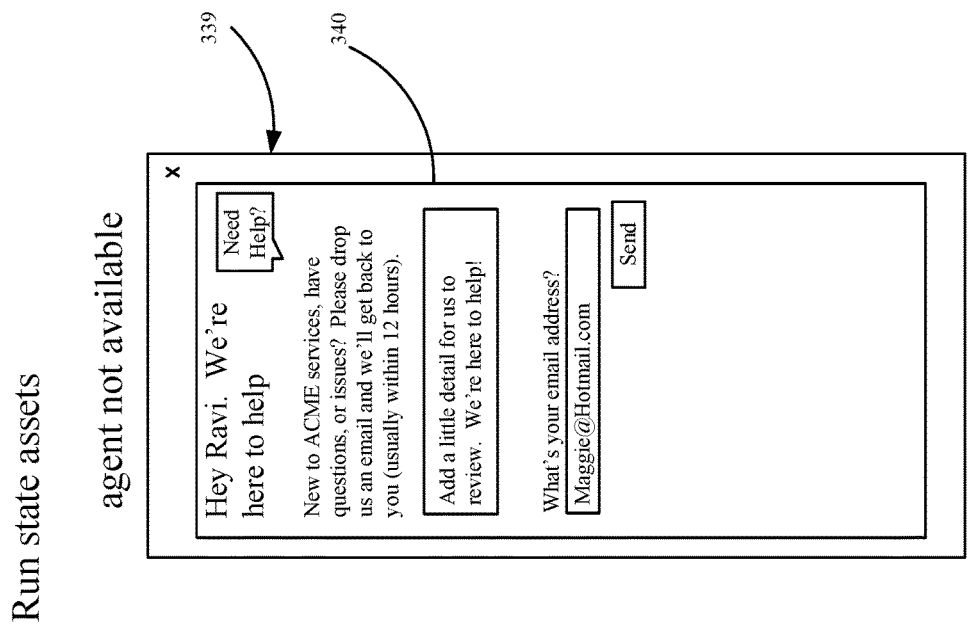

FIGS. 6A and 6B are similar to FIGS. 5A and 5B, and similar items are similarly numbered. FIGS. 6A and 6B may be generated when the tenant is already running the service, but is having a problem or issue with the service. Both FIGS. 6A and 6B include an introductory or salutation portion, 334 and 336, similar to those shown in FIGS. 5A and 5B. FIG. 6A shows one example of a user interface display 337 that may be generated by agent available logic 450 when an agent is available. When an agent is available, the user can enter a telephone number in a text box to receive a call. This is illustrated generally at 338. Alternatively, the user can add detail and a contact address (such as an e-mail address) as indicated generally at block 342. FIG. 6B shows one example of a user interface display 339 that may be generated by agent unavailable logic 452 when an agent is not available. The user can describe the problem and enter contact information, as shown generally at 340.

Figure 6C:
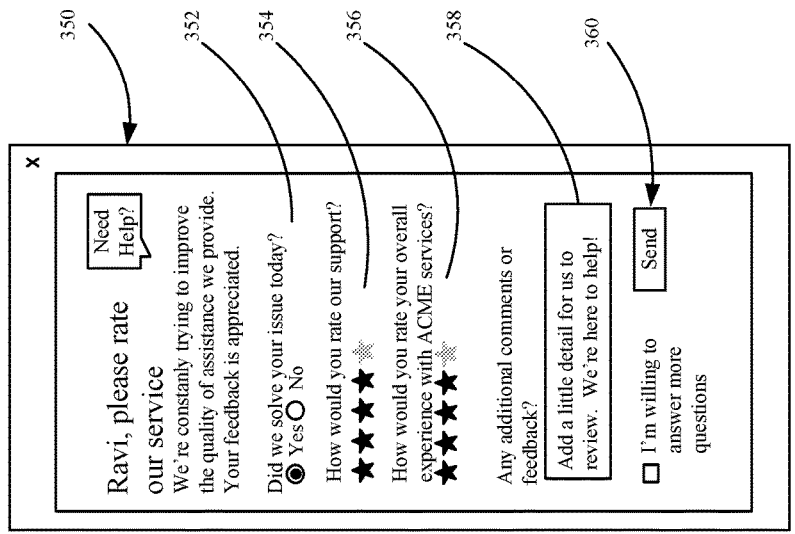

FIG. 6C shows an example of another user interface display 350. Display 350 can be generated by UEX generator 435 in reputation metric generation logic 436 to provide feedback, after a support agent has helped the user address the problem or issue that the user was dealing with. The display can provide a user input mechanism 352 that allows the user to indicate whether the issue was resolved. A user input mechanism 354 can be provided to allow the user to rate his or her support, and a user input mechanism 356 can be provided to allow the user to rate his or her overall experience. A comments user input mechanism 358 can be provided, as can a set of controls 360, that allow the user to submit the feedback or to answer further questions.

Figure 7A:
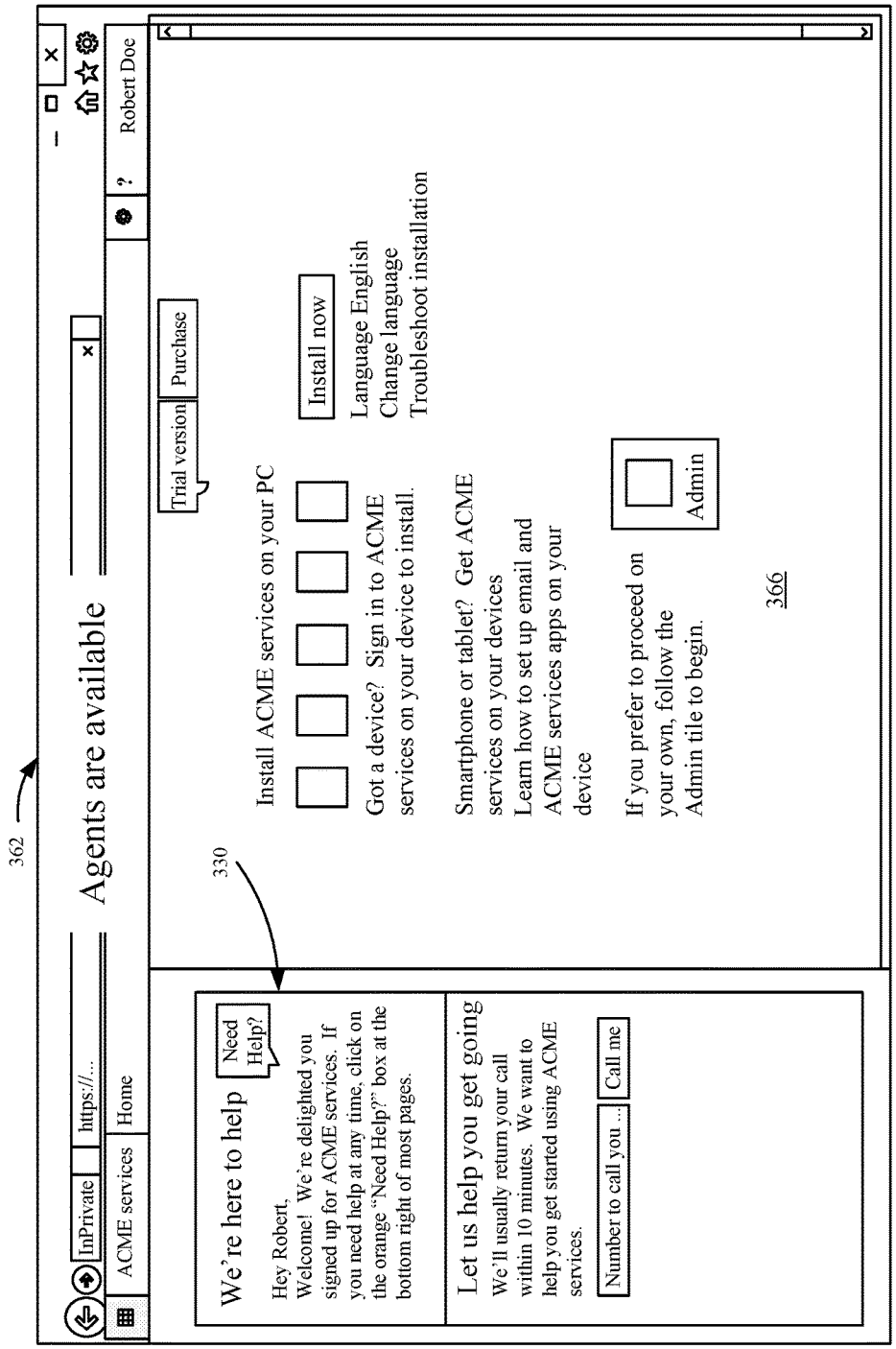
FIGS. 7A-7B show examples of user interface displays.
Figure 7B:
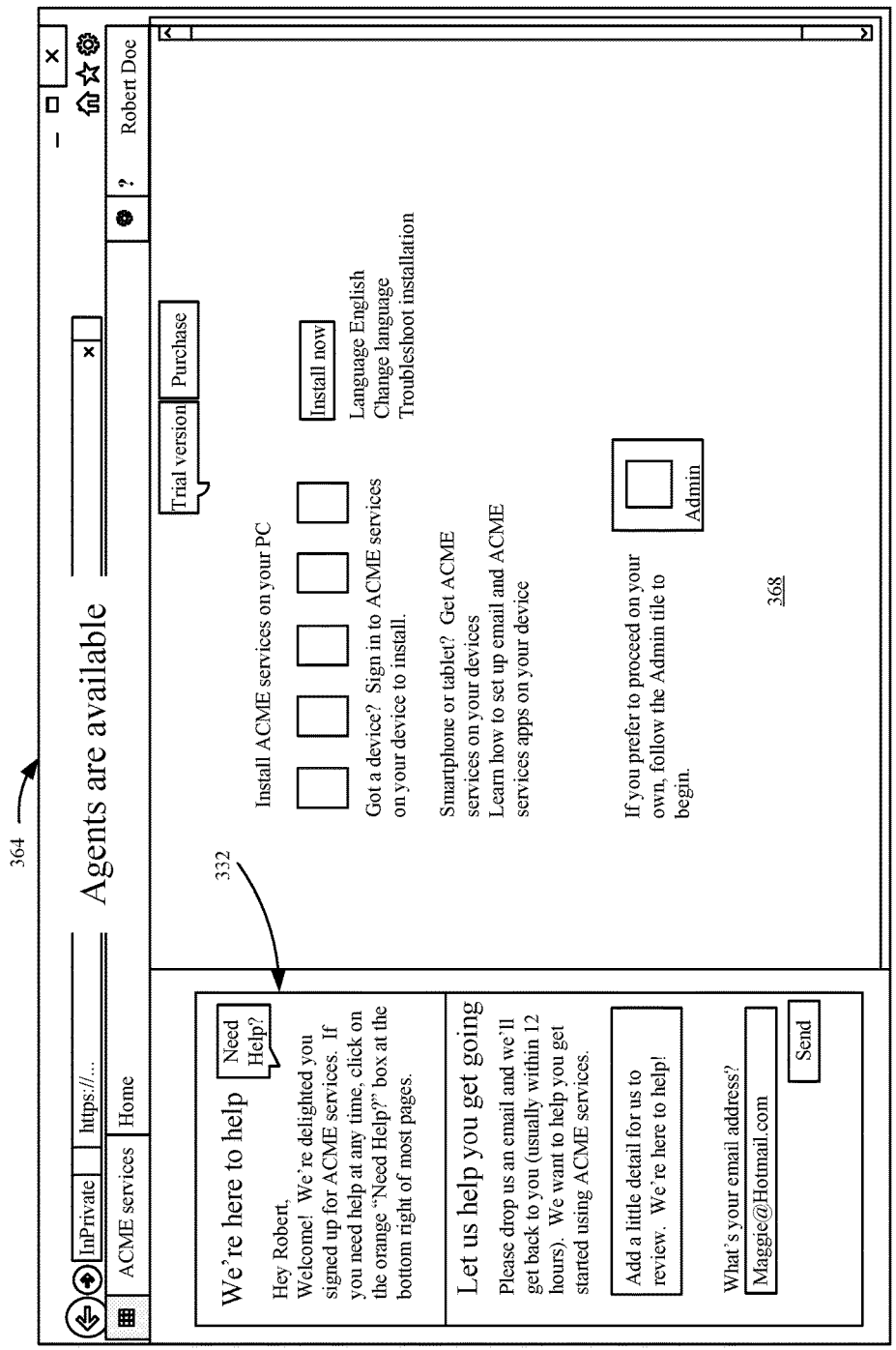

FIGS. 7A and 7B show user interface displays 362 and 364, respectively. They are illustratively user interface displays that can be generated when an issue is automatically detected or when system 112 is otherwise triggered. It can be seen that FIG. 7A includes a first user interface display portion 366 that can be displayed when the user beings running a service. Also, user interface display 330 (described above with respect to FIG. 5A) is shown adjacent display portion 364.

FIG. 7B is similar to that in FIG. 7A, and similar items are similarly numbered. Therefore, display 364 includes display portion 368 that can be generated when the user begins running a service. Also, if a support agent is unavailable, user interface display 332 (described above with respect to FIG. 5B) can be displayed instead of user interface display 330, (as shown in FIG. 7A).

Figure 8A:
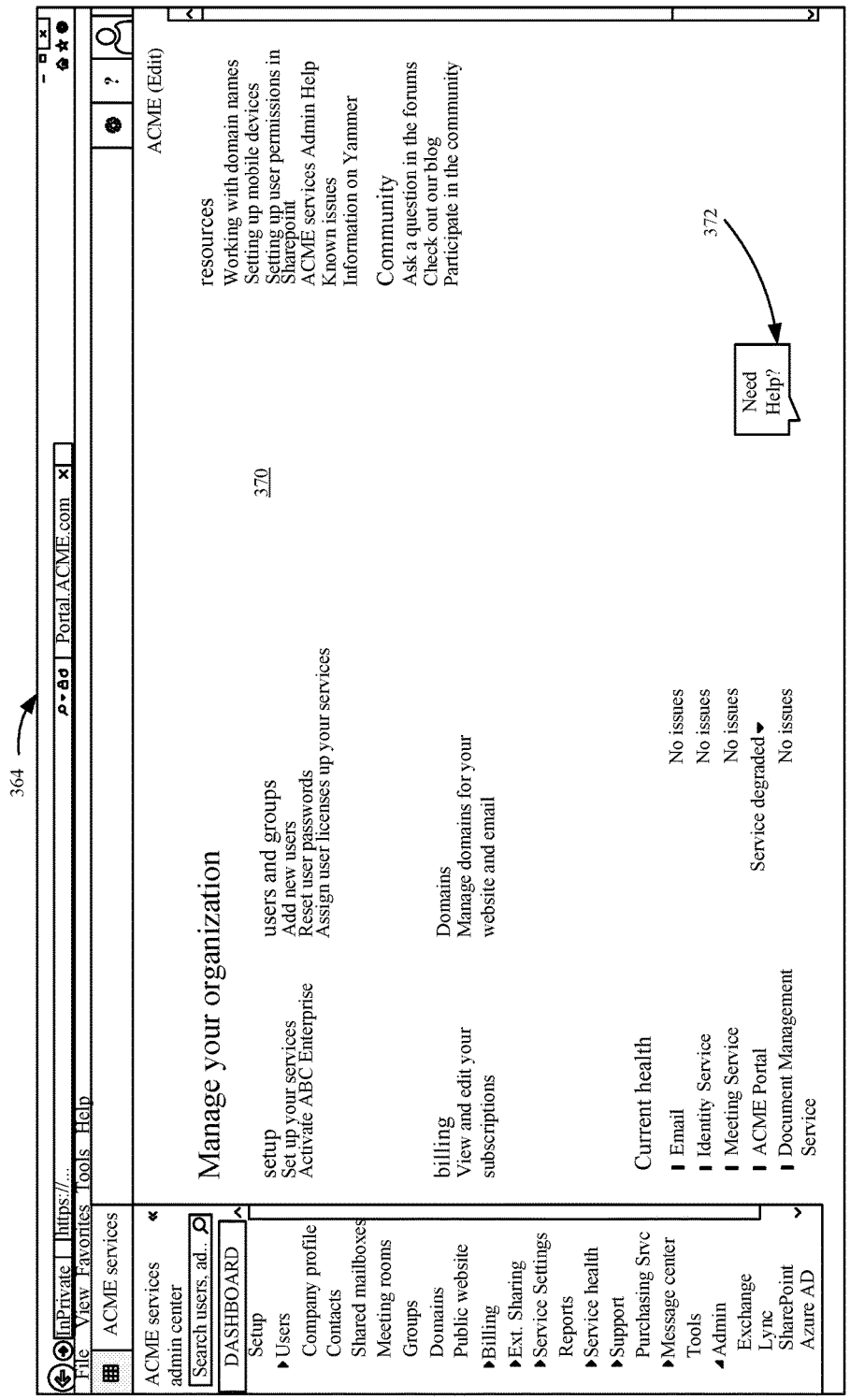
FIGS. 8A-8B show examples of user interface displays.
Figure 8B:
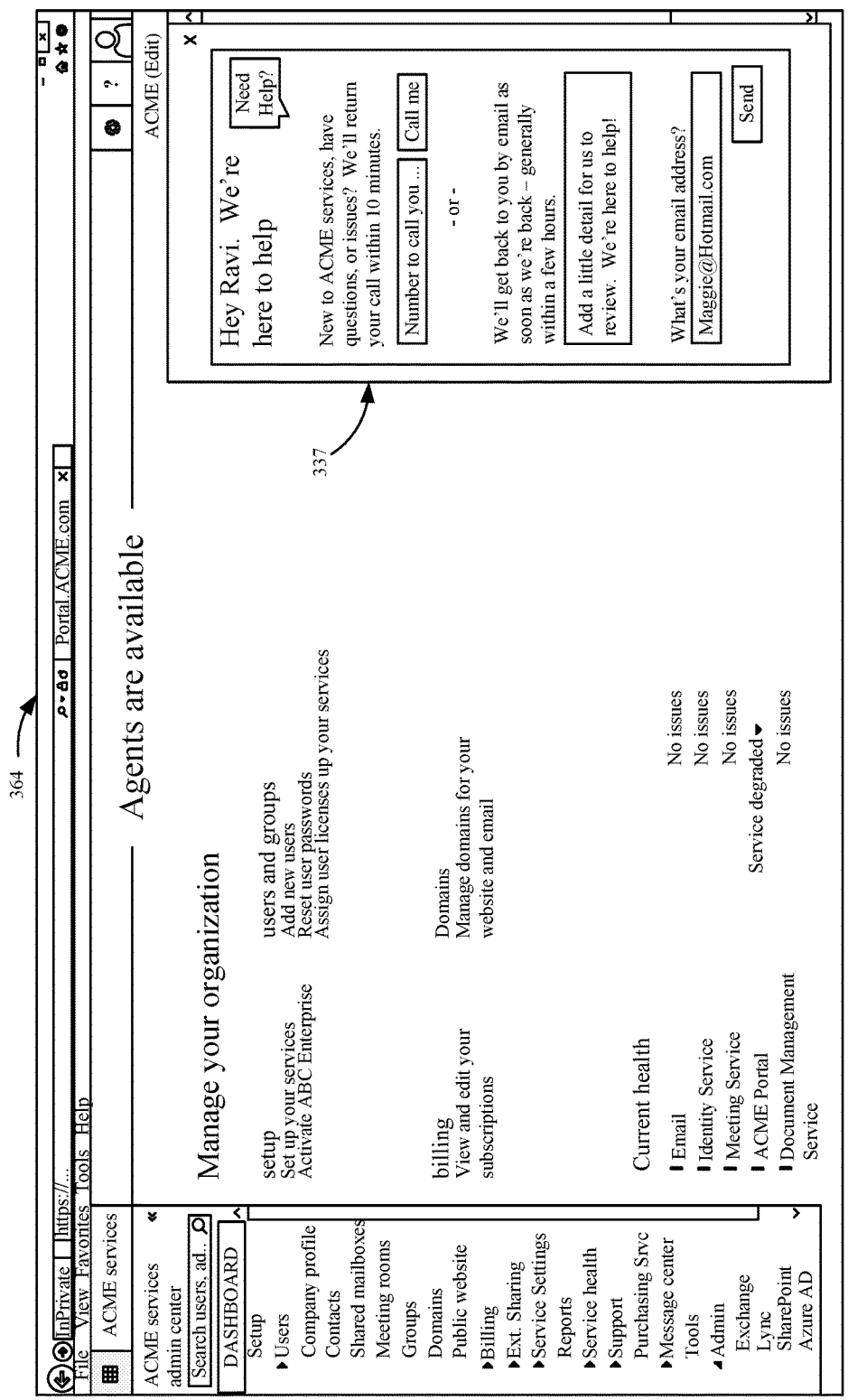

FIGS. 8A and 8B show how displays can be generated, when the user actuates a help user input mechanism to affirmatively request help. For instance, FIG. 8A shows a user interface display 370 that can be generated for an administrative user who is attempting to organize a tenant service. A help user input mechanism 372 is generated, and may be displayed on every page, slightly above the lower bound of the page, or elsewhere. When the user actuates user input mechanism 372, a help display can be generated, such as display 337, which was described in greater detail above with respect to FIG. 6A, or any other suitable display.

Figure 9:
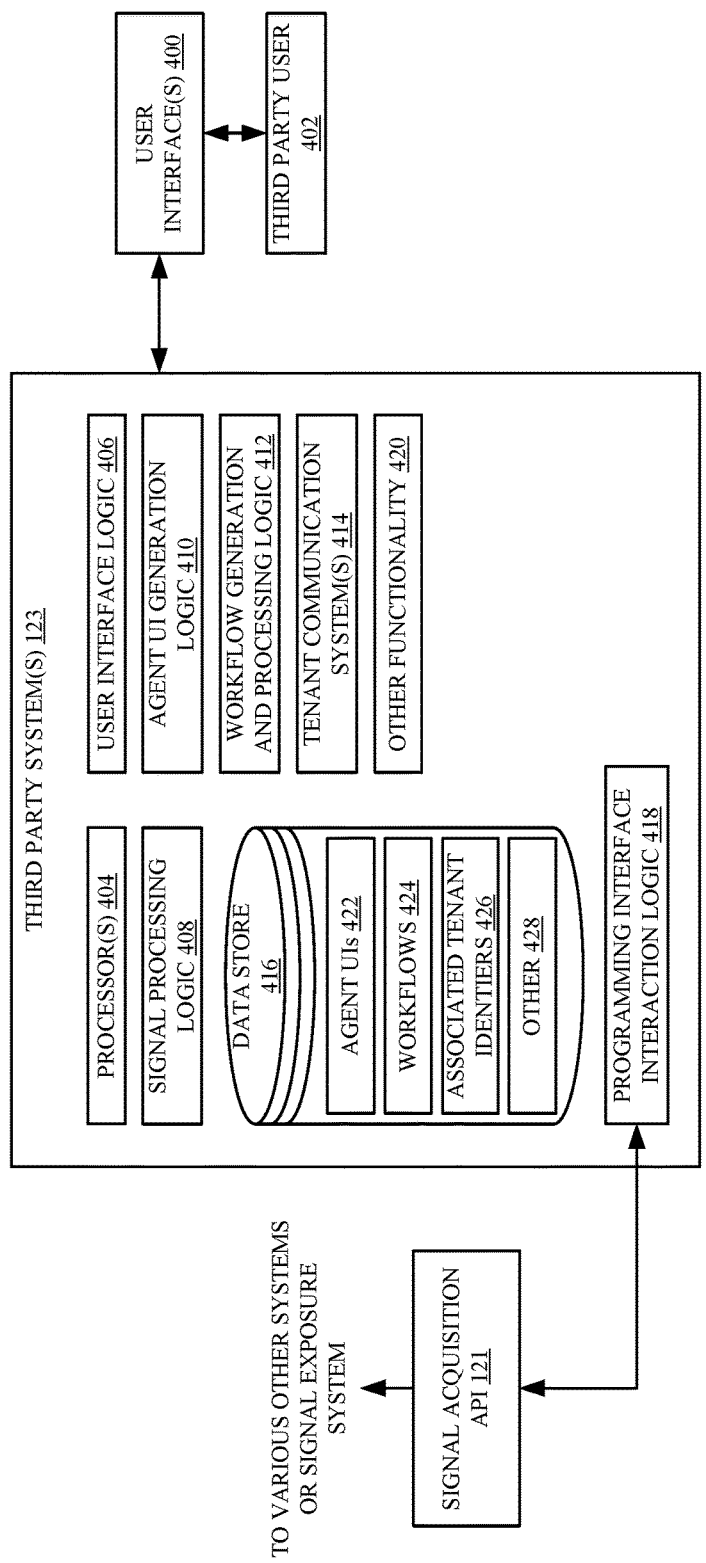
FIG. 9 is a block diagram showing one example of a third party system in more detail.

FIG. 9 is a block diagram showing one example of a third-party system 123 in more detail. System 123 is shown accessing signal acquisition API 121 in order to obtain any or all of the various client engagement signals discussed above with respect to previous figures. System 123 is also shown generating user interfaces 400 for interaction by third-party users 402. User interfaces 400 may include user input mechanisms which can be manipulated by third-party users 402 in order to control and manipulate third-party system 123.

In the example shown in FIG. 9, third-party system 123 includes one or more processors or servers 404, user interface logic 406, signal processing logic 408, agent user interface (UI) generation logic 410, workflow generation and processing logic 412, tenant communication systems 414, data store 416, programming interface interaction logic 418, and it can include a wide variety of other functionality 420 as well. Also, in the example shown in FIG. 9, data store 416 can store agent user interfaces 422, workflows 424, associated tenant identifiers 426, and it can include other items 428.

Agent UI generation logic 410 can be accessed by third-party user 402 in order to generate agent user interfaces 422. Interfaces 422 can be used to surface any or all of the tenant engagement signals obtained through signal acquisition API 121.

Workflow generation and processing logic 412 can also be accessed by user 402 in order to generate workflows 424. The workflows 424 can be workflows that are launched or otherwise run in response to receiving various tenant engagement signals.

Tenant communication systems 414 can be used to allow various third-party users 402 to communicate with one or more tenant organizations 118, or various client systems 120, 124, 126 and/or 128. Such communication systems 414 can include communication systems that communicate through a network, such as web-based communications, cellular communication systems, near field communication systems, or a wide variety of other communication systems.

Once the agent user interfaces 422 and workflows 424 are configured, programming interface interaction logic 418 illustratively interacts with signal acquisition API 121 in order to obtain any desired tenant engagement signals that the agent UIs 422 are configured to surface, or that workflows 424 are configured to operate on, or both. In doing so, programming interface interaction logic 418 may obtain associated tenant identifiers 426 which identify tenants that are associated with the particular third-party that has deployed third-party system 123. For instance, it may be that one or more different third-parties may not be permitted to access tenant engagement signals from some of the tenant organizations or the various client systems in architecture 100. In that case, programming interface interaction logic 418 will not allow third-party system 123 to obtain access to those tenant engagement signals through signal acquisition API 121. It can do so by identifying the particular tenants or clients that are associated or authorized for this particular third-party and confining signal acquisition to signals from those tenants or clients only.

Signal processing logic 408 can perform various signal processing on the acquired signals so that those signals can be surfaced by user interface logic 406, through agent user interfaces 422. It can also perform processing on the acquired signals so that they can be used by various workflows 424 that may be launched by system 123. Third-party users 402 can perform operations corresponding to those workflows and agent user interfaces. Some examples of such operations or workflows are described below with respect to FIG. 11.

Figure 10:
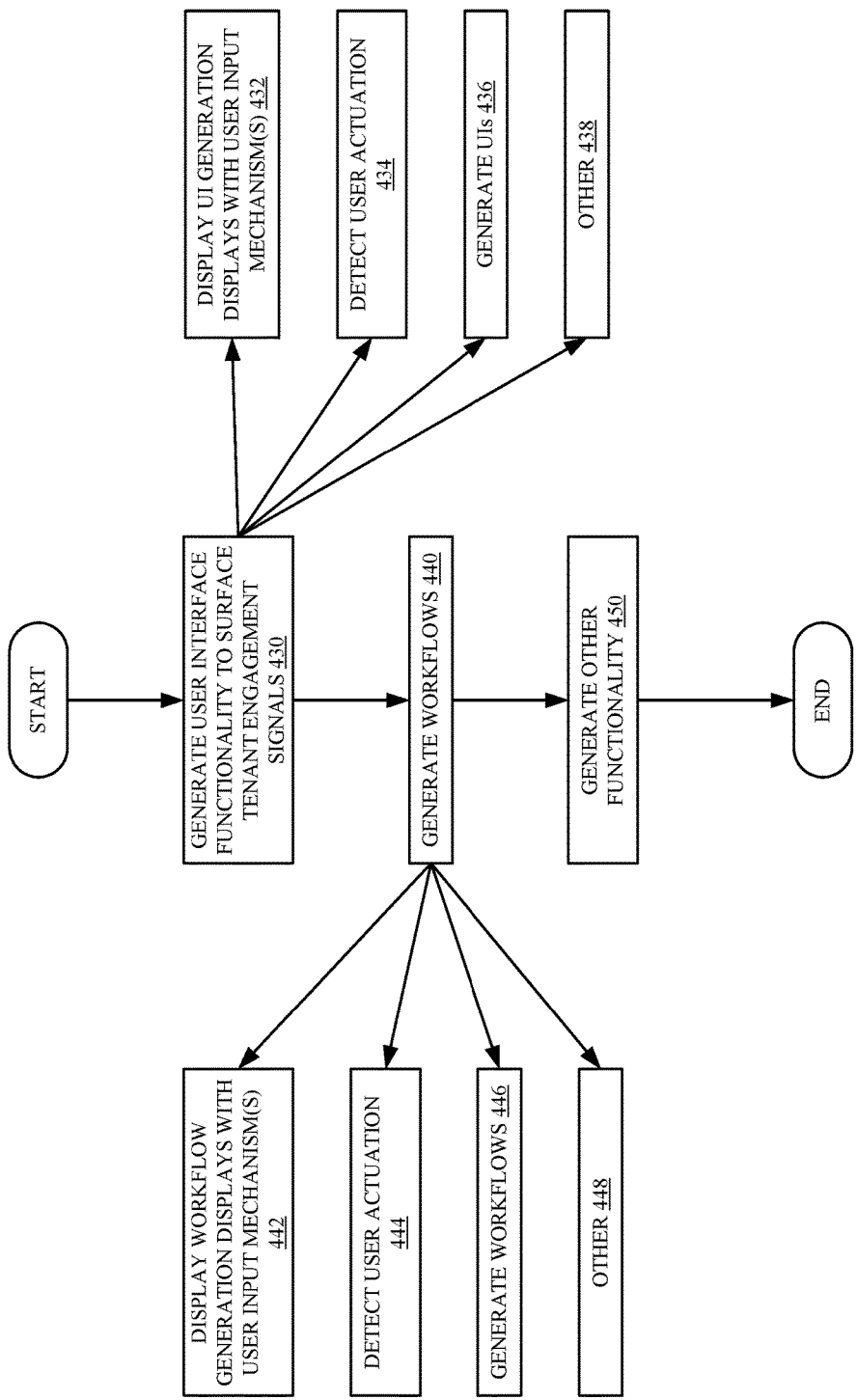
FIG. 10 is a flow diagram illustrating one example of the operation of the third party system in generating functionality to use in configuring components that use exposed tenant engagement signals.

FIG. 10 is a flow diagram illustrating one example of the operation of third-party system 123 in allowing a third-party user 402 to configure agent user interfaces 422 and workflows 424. System 123 first receives an input from third-party user 402 indicating that user 402 wishes to generate agent user interfaces 422 or workflows 424, or both. In response, agent UI generation logic 410 uses user interface logic 406 in order to generate user interface functionality, embodied in agent UIs 422, that can be used to surface the tenant engagement signals for the users of third-party system 123. This is indicated by block 430 in FIG. 10.

For instance, agent UI generation logic 410 can generate and display user interface generation displays with corresponding user input mechanisms that can be actuated by user 402 in order to generate agent UIs 422. Displaying the UI generation displays is indicated by block 432. Logic 410 then detects user actuation of the input mechanisms and generates the UIs, based on the user inputs. This is indicated by blocks 434 and 436 in FIG. 10. The agent user interfaces 422 can be generated in other ways as well, and this is indicated by block 438.

Workflow generation and processing logic 412 then allows user 402 to generate workflows 424, that can be launched and run based on the received tenant engagement signals. Generating the workflows is indicated by block 440 in FIG. 10. By way of example, workflow generation and processing logic 412 can display workflow generation displays that have user input mechanisms that can be actuated by user 402 in order to configure or otherwise generate workflows 424. Displaying the workflow generation displays is indicated by block 442 in FIG. 10. Logic 412 then detects user actuation of those user input mechanisms and generates or configures workflows 424, based upon the user inputs. This is indicated by blocks 444 and 446 in FIG. 10.

Workflows 424 can be generated in other ways as well. This indicated by block 448.

It will also be noted that while the generation of agent user interfaces 422 and workflows 424 are described herein, a wide variety of other functionality for surfacing, processing, analyzing, or otherwise handling the tenant engagement signals can be generated as well. Generating this other functionality is indicated by block 450 in FIG. 10.

Figure 11:
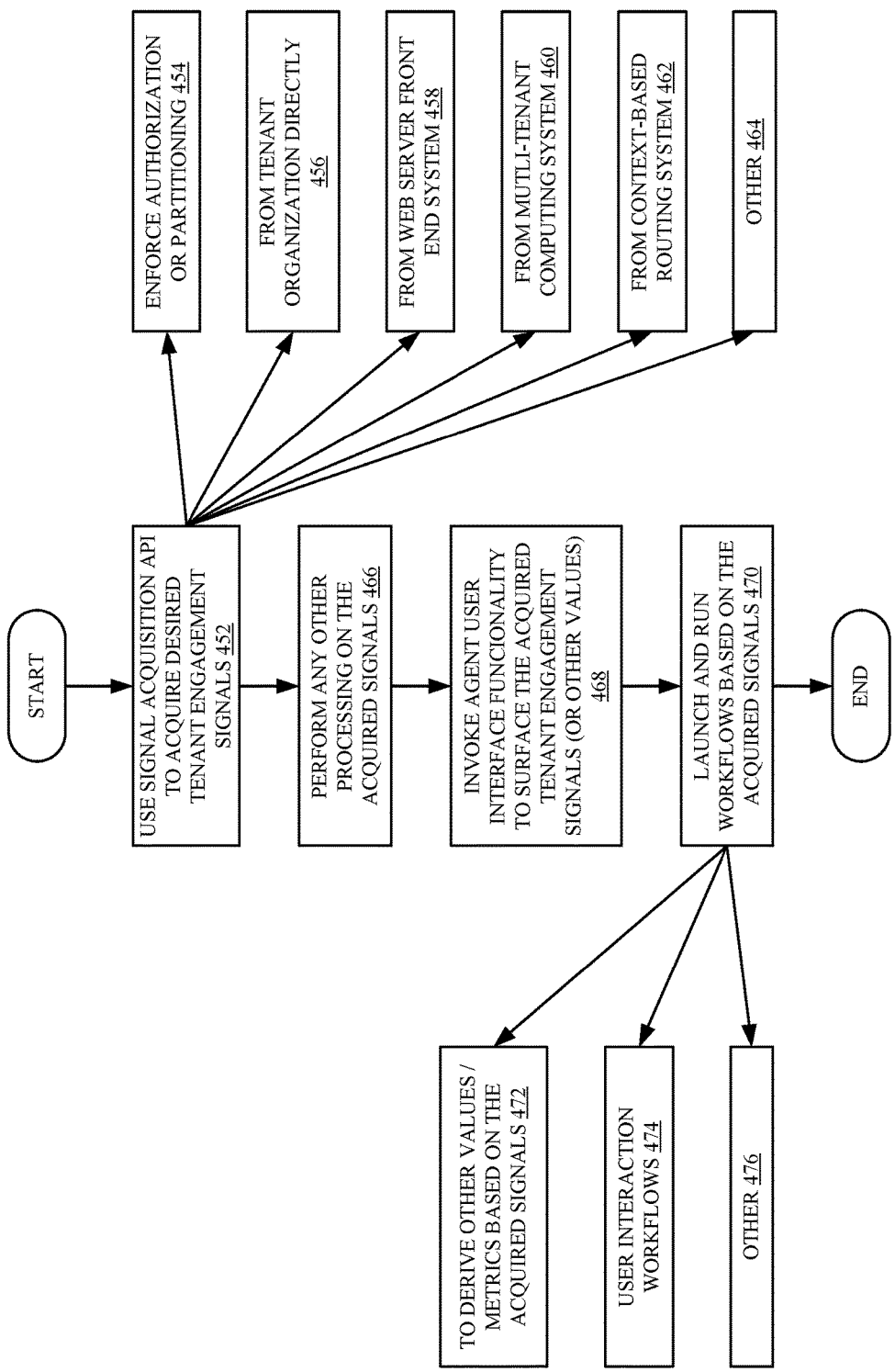
FIG. 11 is a flow diagram showing one example of the operation of the third party system in utilizing the tenant engagement signals.

FIG. 11 is a flow diagram illustrating one example of the operation of third-party system 123, during runtime, in acquiring tenant engagement signals and surfacing those signals and performing workflow functions based upon those signals. Programming interface interaction logic 418 first uses signal acquisition API 121 in order to acquire any desired tenant engagement signals from the various systems in architecture 100. This is indicated by block 452 in FIG. 11. In doing so, it illustratively accesses the associated tenant identifiers 426 and enforces any authorizations or partitioning of the various tenants in architecture 100, so that system 123 only has access to the tenant engagement signals from those tenants for which it is authorized or which belong to a partition for which system 123 is authorized. Enforcing the authorizations or partitioning is indicated by block 454.

Programming interface interaction logic 418 can use signal acquisition API 121 to obtain the tenant engagement signals from any or all of the systems in architecture 100. For instance, it can obtain tenant engagement signals from the tenant organizations directly, as indicated by block 456. It can obtain tenant engagement signals from web server front end system 114, and this is indicated by block 458 in FIG. 11. It can obtain tenant engagement signals from multi-tenant computing system 102, as indicated by block 460. The tenant engagement signals can also be obtained from context-based routing system 112. This is indicated by block 462. The information can be the signals directly generated by the client systems or tenant organizations, or the tenant engagement signals can be other metrics or values derived from those signals, such as an identified issue identified by problem identification system 188, the engagement state of the tenant or context information generated by systems 186 and 184, respectively, or any or all of the other information generated by the systems in architecture 100. Obtaining tenant engagement signals from other systems is indicated by block 464 in FIG. 11.

Signal processing logic 408 can then perform any other processing based on the acquired signals. This is indicated by block 466. For instance, it may be that users of third-party system 123 have developed their own processing in order to obtain other values based upon the acquired signals, other than those that are generated elsewhere in architecture 100. For instance, it may be that signal processing logic 408 aggregates values generated in architecture 100, derives additional values based upon that information, or performs other processing based upon the acquired signals. All of these are contemplated herein.

User interface logic 406 then invokes agent user interface functionality embodied in agent UIs 422 in order to surface the acquired tenant engagement signals (or other values), for user 402. This allows user 402 to have visibility into the various tenant engagement signals generated in architecture 100 or generated by signal processing logic 408. Invoking the agent UIs 422 to surface this information for user 402 is indicated by block 468 in FIG. 11.

Signal processing logic 408 can also launch workflows and run them, based upon the acquired signals. This is indicated by block 479 in FIG. 11. Those workflows may be run to derive yet other values or metrics based upon the acquired signals. This is indicated by block 472. They may be user interaction workflows that surface information for user 402 and allow user 402 to interact with that information, or to control tenant communication systems 414 to communicate with various tenants, based upon that information, or to otherwise interact with the workflows. Launching and running user interaction workflows is indicated by block 474. Launching and running workflows can be done in other ways as well, and this is indicated by block 476 in FIG. 11.

The particular workflows or functions that third-party system 123 can perform based on the acquired tenant engagement signals can vary widely. As one example, it may be that third-party system 123 runs a workflow that determines what percent of the tenants identified by associated tenant identifiers 426 are engaged with a multi-tenant service that they are currently on-boarding. Based on the percent of tenant engagement, it may be that a particular workflow takes certain actions. For instance, if the percent of tenant engagement is below a certain threshold level, and the velocity with which the tenant users are engaging the service is also below a threshold, then the workflow may proactively, and automatically, contact users at that tenant to setup training meetings. In another example, the workflow may automatically access training information that is specifically tailored to the engagement state of the monitored tenant, and send that training information to the tenant, or the individual users of the tenant. The workflow can perform a wide variety of other functions that are calculated to increase the percent of tenant engagement, or the velocity with which the tenant users are engaging the service, or both.

The workflow may also perform functions based upon the particular step in the on-boarding processing where the tenant currently resides. For instance, the workflow may aggregate tenant engagement information indicative of the particular step that the individual users of a given tenant are currently on, to determine what percent of the tenants have performed a particular step (such as to see what percent of the tenant users have verified a domain in the on-boarding process, etc.). If that percent does not meet a threshold level, then the workflow may generate specific training materials, or setup training appointments, or otherwise perform specific tasks that are calculated to assist the users of the subject tenant in verifying a domain.

It will be noted that these are examples only. The workflows in system 123 may be authored so that they look for a wide variety of different triggers (which can be derived from the acquired tenant engagement signals) to perform a wide variety of different actions or functionality. Those actions or functionality can vary from simply surfacing information to users of third-party systems 123, to automatically performing functions within system 123, to proactively engaging users of tenant organizations in architecture 100, to a wide variety of other functions. All of these and others are contemplated herein.

It will thus be noted that, in one example, API 121 serves as a wrapper on the entire architecture shown in FIG. 1, and surfaces substantially any information, sensed or generated in any of the systems 102, 104, 112, 114 or any of the client systems, that identifies where a user or tenant organization is in the on-boarding process of, or runtime engagement with, a service. This can be determined by how the tenant has interacted with the service being on-boarded (e.g., the on-boarding state and velocity of on-boarding, the tenant engagement state, etc.). The exposed signal thus gives an indication of information that third party developers can use to write code to assist users in the on-boarding process or in runtime engagement with a service. The code might be, for instance, code that surfaces the information for a support agent in the third party organization.

In one example, the third parties determine what is important to acquire (i.e., the particular content of the tenant engagement signal) and what they do with that signal once they have acquired it. The API 121 wraps the architecture in this wrapper so all the tenant on-boarding and engagement information (the tenant engagement signal(s)) can be acquired through API 121 and used by third parties however they want. The third parties can selectively acquire the particular information they desire and write whatever code to handle that information they wish to write.

Some examples of what the content of the signal might be have been described (e.g., the state of engagement of a tenant and how quickly they are moving through the on-boarding steps). In addition, some examples of what the third parties might do with that have also been described. It will be noted that these are examples only.

It can also be seen that a variety of different kinds of content information can automatically be obtained, and an engagement state of a user or tenant can be identified. This enhances the operation of the system as very little bandwidth is needed to communicate with a tenant to identify any problems or the engagement state of the tenant. This improves the speed and accuracy of the system and reduces network traffic and UI rendering overhead and processing.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Further, the term "automatically" has been used relative to performing one or more actions. In one example, this means that the one or more actions are performed without further user input, except perhaps to initiate or authorize the one or more actions.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 12:
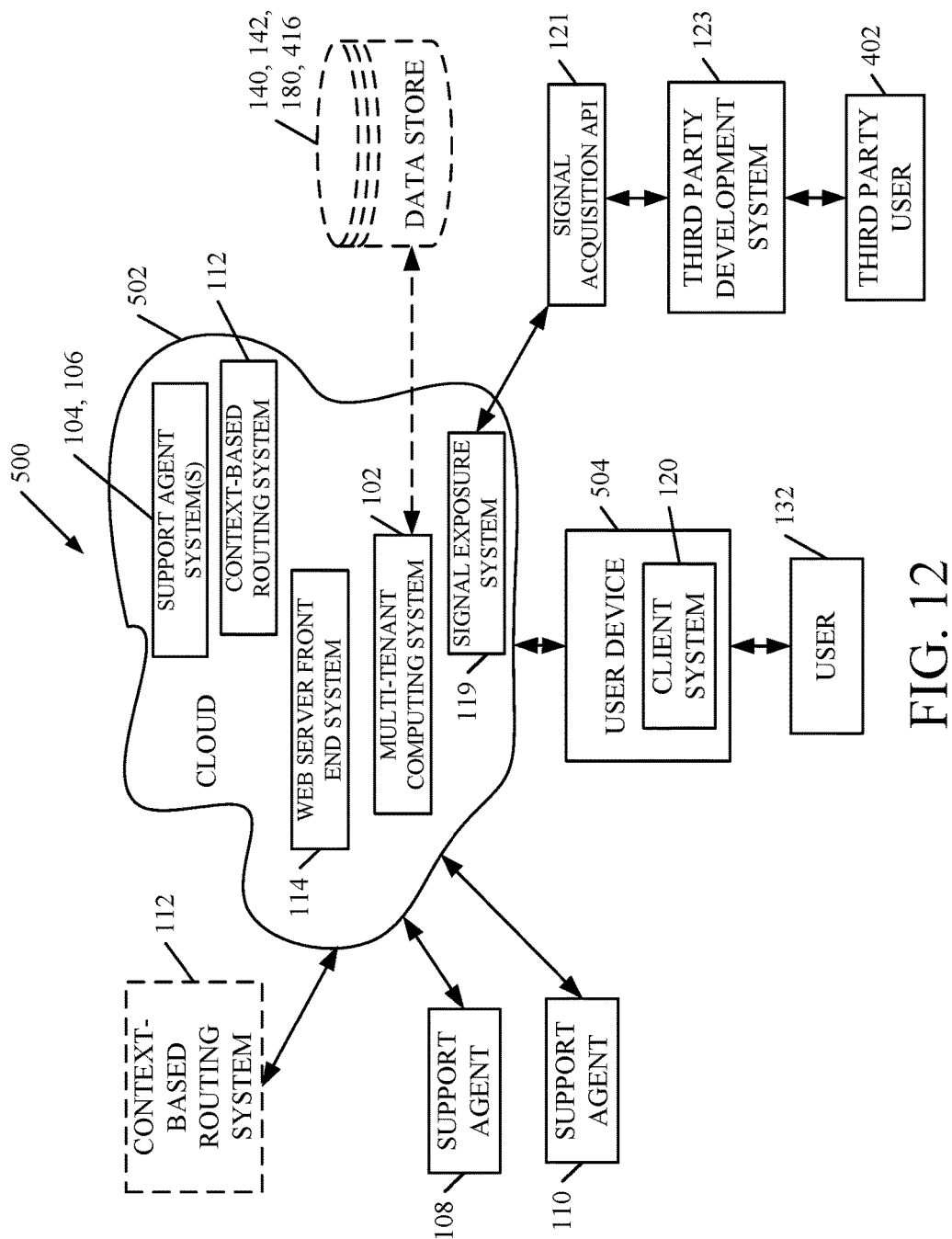
FIG. 12 shows one example of the architecture disposed in FIG. 1, deployed in a cloud computing architecture.

FIG. 12 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 12, some items are similar to those shown in FIG. 1 and they are similarly numbered. FIG. 12 specifically shows that systems 102, 104, 112, 114 and 119 can be located in cloud 502 (which can be public, private, or a combination where portions are public while others are private). Therefore, users 130-136 can use user device (with client systems) 504 to access those systems through cloud 502.

FIG. 12 also depicts another example of a cloud architecture. FIG. 9 shows that it is also contemplated that some elements of architecture 100 can be disposed in cloud 502 while others are not. By way of example, data stores 140, 142, 180 and 416 can be disposed outside of cloud 502, and accessed through cloud 502. In another example, context-based routing system 112 (or other systems) can also be outside of cloud 502. Regardless of where they are located, they can be accessed directly by devices 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 13:
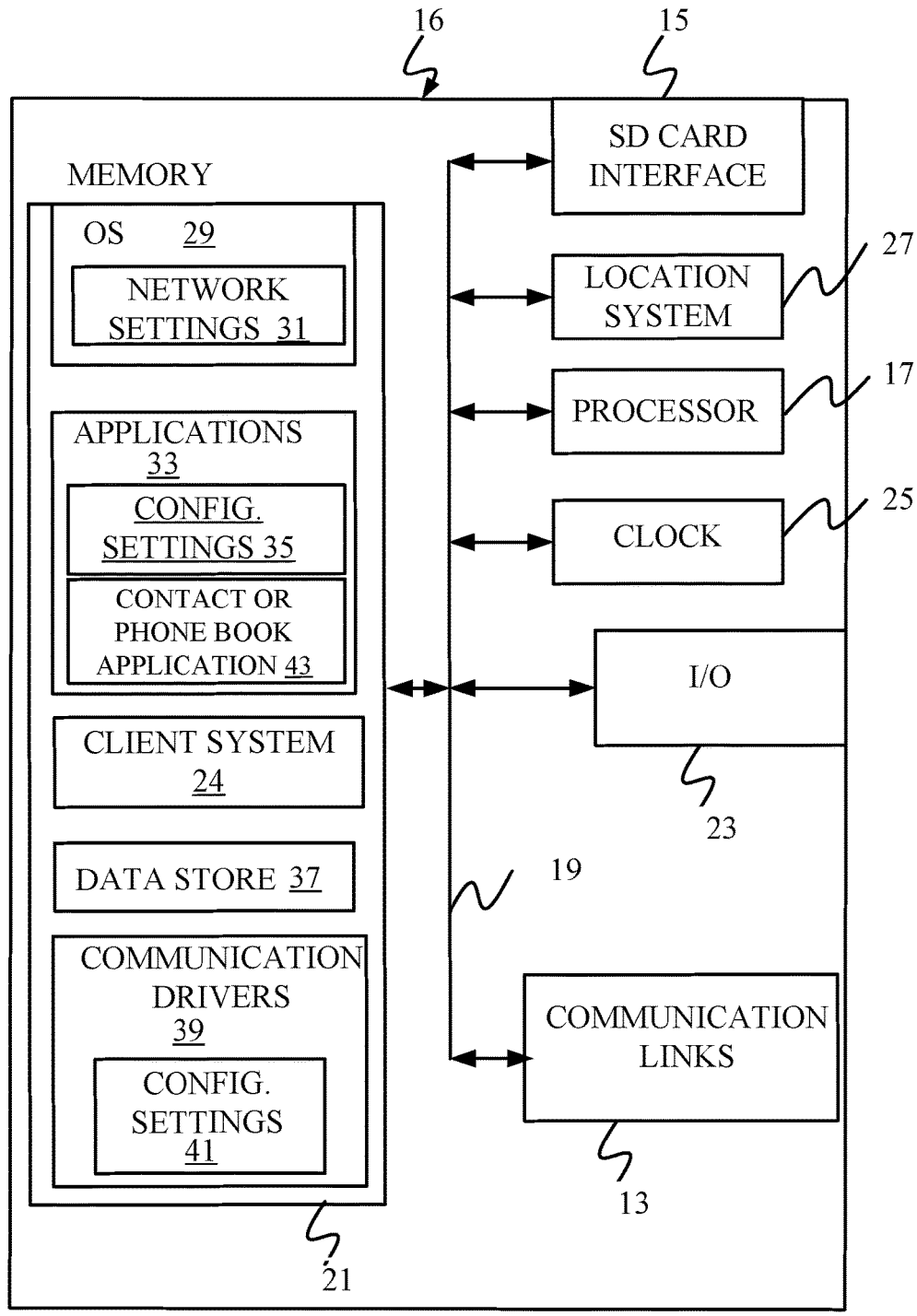
FIGS. 13-15 show examples of mobile devices that can be used in the architectures of the previous figures.
Figure 14:
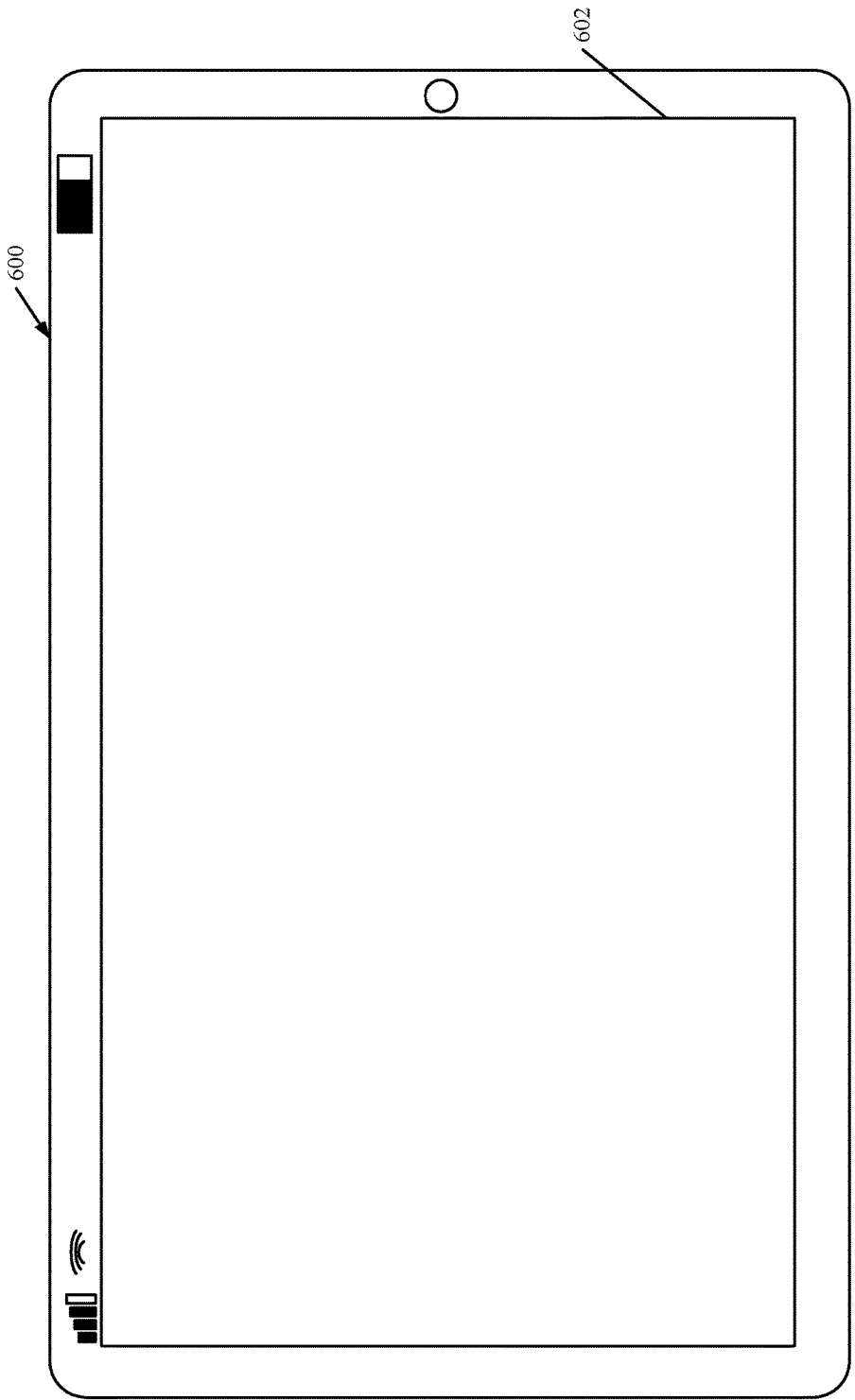
Figure 15:
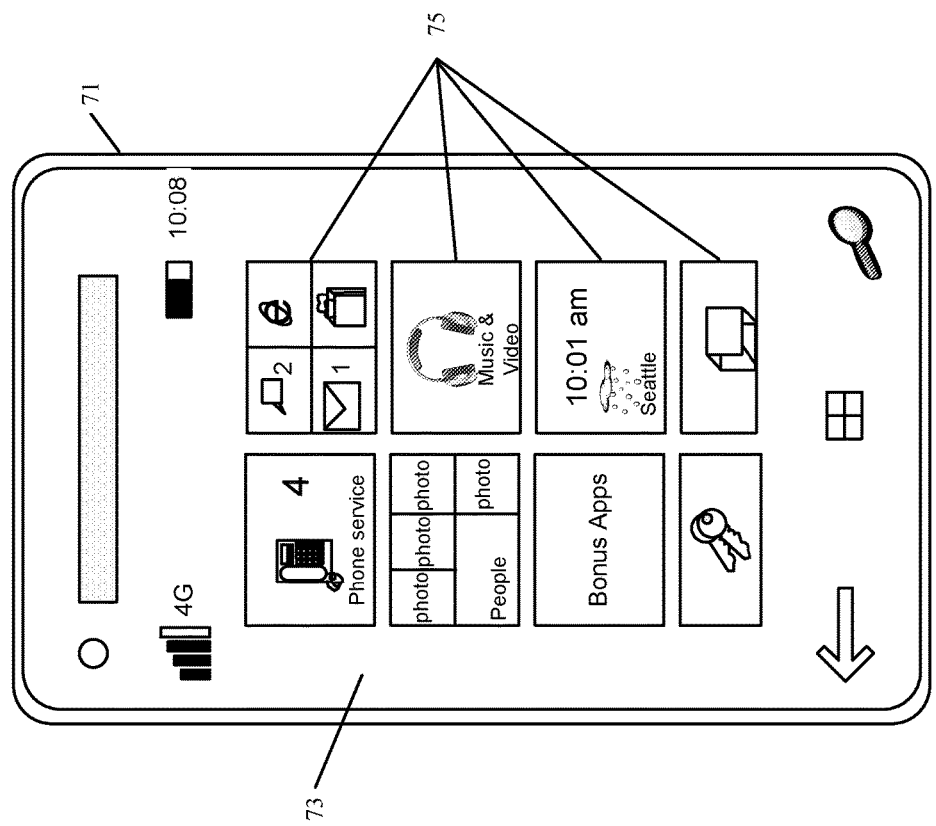

FIG. 13 is a simplified block diagram of one illustrative example of a handheld or mobile computing device that can be used as a user's or client's hand held device 16, in which the present system (or parts of it) can be deployed. FIGS. 14-15 are examples of handheld or mobile devices.

FIG. 13 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors or servers or virtual machines from the previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 14 shows one example in which device 16 is a tablet computer 600. In FIG. 14, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 15 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 16:
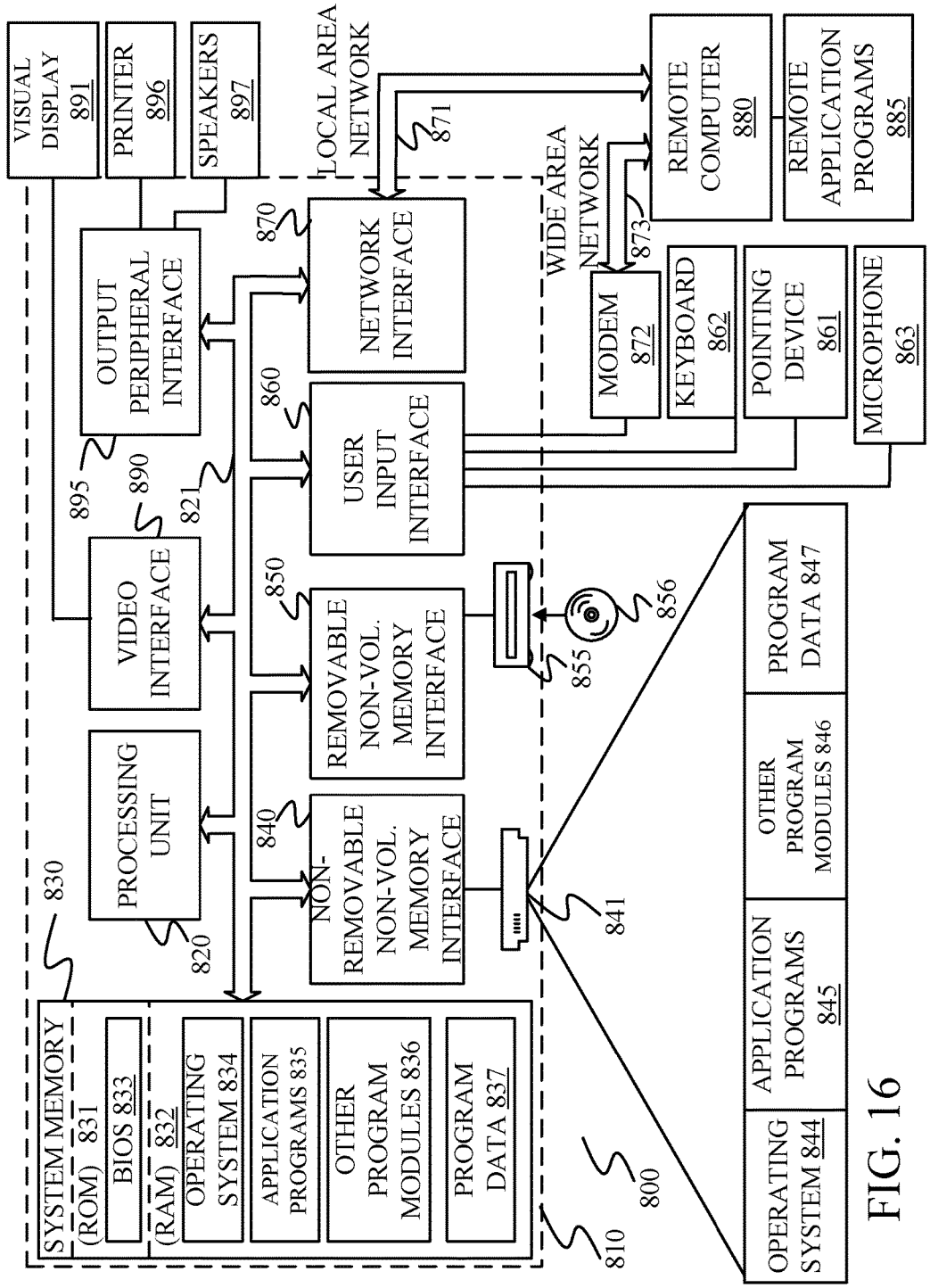
FIG. 16 is a block diagram of one example of a computing environment that can be used in the architectures of the previous figures.

FIG. 16 is one example of a computing environment in which architecture 100, or parts of it, (for example) can be deployed. With reference to FIG. 16, an example system for implementing some embodiments includes a general-purpose computing device in the form of a computer 810. Components of computer 810 may include, but are not limited to, a processing unit 820 (which can comprise processor or servers or virtual machines from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 16.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 16 illustrates operating system 834, application programs 835, other program modules 836, and program data 837.

The computer 810 may also include other removable/non-removable volatile/nonvolatile computer storage media. By way of example only, FIG. 16 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 16, provide storage of computer readable instructions, data structures, program modules and other data for the computer 810. In FIG. 16, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 16 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 16 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a tenant engagement architecture that generates tenant engagement signals indicative of tenant engagement with an on-line service; and
a signal exposure system that exposes a signal acquisition application programming interface (API) to a third party system, the signal exposure API having a method that is called to obtain the tenant engagement signals.

Example 2 is the computing system of any or all previous examples wherein the signal exposure system comprises:

programming interface logic that is configured to expose the signal acquisition API and detect a method call of the method and identify requested tenant engagement signals in the method call.

Example 3 is the computing system of any or all previous examples wherein the signal exposure system comprises:

signal acquisition logic that is configured to interact with the tenant engagement architecture to obtain the requested tenant engagement signals that are returned by the programming interface logic, through the signal acquisition API in response to the method call.

Example 4 is the computing system of any or all previous examples wherein the tenant engagement architecture comprises:

client side engagement sensing logic that generates a client engagement signal indicative of individual client engagement with the on-line service at a tenant organization, the signal exposure system being configured to expose the client engagement signal through the signal acquisition API as a tenant engagement signal.

Example 5 is the computing system of any or all previous examples wherein the tenant engagement architecture comprises:

a multi-tenant computing system that hosts the on-line service for the tenant and generates tenant usage information indicative of tenant use of the on-line service, the signal exposure system being configured to expose the tenant usage information through the signal acquisition API as a tenant engagement signal.

Example 6 is the computing system of any or all previous examples wherein the tenant engagement architecture comprises:

a web server front end system configured to provide an interface between the multi-tenant computing system and the tenant and to generate client interaction information indicative of individual client interaction with the on-line service, the signal exposure system being configured to expose the client interaction information through the signal acquisition API as a tenant engagement signal.

Example 7 is the computing system of any or all previous examples wherein the tenant engagement architecture comprises:

a context-based routing system that generates context information corresponding to a context of the tenant engaging with the on-line service, the signal exposure system being configured to expose the context information through the signal acquisition API as a tenant engagement signal.

Example 8 is the computing system of any or all previous examples wherein the context-based routing system comprises:

an on-boarding step identifier that automatically identifies a step, of a plurality of steps, that a user has completed in a predefined on-boarding process that is used by a user to set up and configure the on-line service, the on-boarding step identifier generating a step identifier indicative of the identified step, the signal exposure system being configured to expose the step identifier through the signal acquisition API as a tenant engagement signal.

Example 9 is the computing system of any or all previous examples wherein the context-based routing system comprises:

velocity detection logic that detects a velocity with which the user has completed the steps in the on-boarding process and generates a velocity indicator indicative of the detected velocity, the signal exposure system being configured to expose the velocity indicator through the signal acquisition API as a tenant engagement signal.

Example 10 is the computing system of any or all previous examples wherein the context-based routing system comprises:

a problem identification system that accesses a set of context-to-problem mappings based on the step identifier and the velocity indicator to identify the on-boarding issue, the signal exposure system being configured to expose the on-boarding issue through the signal acquisition API as a tenant engagement signal.

Example 11 is the computing system of any or all previous examples wherein the client side engagement sensing logic comprises:

idle time detection logic that detects an idle time for which the user is idle on a given user interface display generated during the on-boarding process and generates a UI indicator indicative of the given user interface display and an idle time indicator indicative of the detected idle time, the signal exposure system being configured to expose the UI indicator and the idle time indicator through the signal acquisition API as a tenant engagement signal.

Example 12 is a computer implemented method, comprising:

detecting tenant interaction with an on-line service hosted by a multi-tenant computing system;

generating tenant engagement signals indicative of tenant engagement with on-line service, based on the detected tenant interaction; and exposing a signal acquisition application programming interface (API) to a third party system, the signal exposure API having a method that is called to obtain the tenant engagement signals.

Example 13 is the computer implemented method of any or all previous examples wherein exposing a signal acquisition API comprises:

detecting a method call of the method; and identifying requested tenant engagement signals in the method call.

Example 14 is the computer implemented method of any or all previous examples wherein exposing a signal acquisition API comprises:

interacting with the tenant engagement architecture to obtain the requested tenant engagement signals; and returning the requested tenant engagement signals through the signal acquisition API in response to the method call.

Example 15 is the computer implemented method of any or all previous examples wherein detecting tenant interaction comprises:

generating a client engagement signal indicative of individual client engagement with the on-line service at a tenant organization, and wherein exposing a signal acquisition API comprises exposing the client engagement signal through the signal acquisition API as a tenant engagement signal.

Example 16 is the computer implemented method of any or all previous examples wherein detecting tenant interaction comprises:

automatically identifying a step, of a plurality of steps, that a user has completed in a predefined on-boarding process that is used by a user to set up and configure the on-line service, wherein generating tenant engagement signals comprises generating a step identifier indicative of the identified step, and wherein exposing the signal acquisition API comprises exposing the step identifier through the signal acquisition API as a tenant engagement signal.

Example 17 is the computer implemented method of any or all previous examples wherein detecting tenant interaction comprises:
detecting a velocity with which the user has completed the steps in the on-boarding process, wherein generating tenant engagement signals comprises generating a velocity indicator indicative of the detected velocity, and wherein exposing the signal acquisition API comprises exposing the velocity indicator through the signal acquisition API as a tenant engagement signal.

Example 18 is the computer implemented method of any or all previous examples wherein detecting tenant interaction comprises:
accessing a set of context-to-problem mappings based on the step identifier and the velocity indicator; and
identifying an on-boarding issue, wherein exposing the signal acquisition API comprises exposing the on-boarding issue through the signal acquisition API as a tenant engagement signal.

Example 19 is a computing system, comprising:
an on-boarding step identifier that automatically identifies a step, of a plurality of steps, that a user has completed in a predefined on-boarding process that is used by a user to set up and configure an on-line service, the on-boarding step identifier generating a step identifier indicative of the identified step;
velocity detection logic that detects a velocity with which the user is completing the steps in the on-boarding process and generates a velocity indicator indicative of the detected velocity;
a problem identification system that accesses a set of context-to-problem mappings based on the step identifier and the velocity indicator to identify an on-boarding issue; and
a signal exposure system that exposes a signal acquisition application programming interface (API) to a third party system, the signal exposure API having a method that is called to obtain tenant engagement signals indicative of the step identifier, the velocity indicator, and the on-boarding issue.

Example 20 is the computing system of any or all previous examples and further comprising:
client side engagement sensing logic that generates a client engagement signal indicative of individual client engagement with the on-line service at a tenant organization;
a multi-tenant computing system that hosts the on-line service for the tenant and generates tenant usage information indicative of tenant use of the on-line service; and
a web server front end system configured to provide an interface between the multi-tenant computing system and the tenant and to generate client interaction information indicative of individual client interaction with the on-line service, the signal exposure system being configured to expose the client engagement signal, the tenant usage information and the client interaction information through the signal acquisition API as a tenant engagement signal.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computing system, comprising:
a processor; and
memory storing instructions executable by the processor, wherein the instructions, when executed, configure the computing system to provide:
a service hosting component configured to host an on-line service for a tenant, wherein the hosted on-line service is accessible, over a computer network, by a plurality of users associated with the tenant;
a tenant engagement system configured to:
generate tenant usage information indicative of usage of the hosted on-line service by the plurality of users associated with the tenant; and
generate context information corresponding to a context of the usage of the hosted on-line service; and
a signal exposure system configured to:
expose a signal acquisition application programming interface (API) to a third party system, the signal acquisition API having a method configured to be called to acquire a tenant engagement signal indicative of the tenant usage information and the context information;
detect a method call from the third party system, wherein the method call calls the method of the signal acquisition API and requests the tenant engagement signal; and
in response to the method call, provide the tenant engagement signal to the third party system through the signal acquisition API.

2. The computing system of claim 1 wherein the signal exposure system comprises:
signal acquisition logic that is configured to interact with the tenant engagement system to obtain the requested tenant engagement signal that are returned by the signal exposure system, through the signal acquisition API in response to the method call.

3. The computing system of claim 2 wherein the tenant engagement system comprises:
client side engagement sensing logic configured generate a client engagement signal indicative of individual client engagement with the on-line service at a tenant organization, the signal exposure system being configured to expose the client engagement signal through the signal acquisition API as the tenant engagement signal.

4. The computing system of claim 3 wherein the service hosting component comprises a multi-tenant computing system.

5. The computing system of claim 4 wherein the tenant engagement system comprises:
a web server front end system configured to:
provide an interface between the multi-tenant computing system and the tenant; and
generate client interaction information indicative of individual client interaction with the on-line service, wherein the context information includes the client interaction information.

6. The computing system of claim 2 wherein the tenant engagement system comprises:
a context-based routing system configured to generate the context information corresponding to a context of the tenant engaging with the on-line service.

7. The computing system of claim 6 wherein the context-based routing system comprises:
an on-boarding step identifier configured to:
automatically identify a step, of a plurality of steps, that a user has completed in a predefined on-boarding process that is used by a user to set up and configure the on-line service; and generate a step identifier indicative of the identified step,
wherein the context information includes the step identifier.

8. The computing system of claim 7 wherein the instructions, when executed, configure the computing system to provide:
a workflow generation component configured to launch a workflow based on the obtained tenant engagement signal, the workflow being configured to assist the tenant in the on-boarding process.

9. The computing system of claim 7 wherein the context-based routing system comprises:
rate detection logic configured to:
detect a rate with which the user has completed steps in the on-boarding process; and
generate a rate indicator indicative of the detected rate, wherein the context information includes the rate indicator; and
a problem identification system configured to:
access a set of context-to-problem mappings based on the step identifier and the rate indicator to identify the on-boarding issue,
wherein the context information includes the on-boarding issue.

10. The computing system of claim 3 wherein the client side engagement sensing logic comprises:
idle time detection logic configured to:
detect an idle time for which the user is idle on a given user interface display generated during the on-boarding process; and
generate a UT indicator indicative of the given user interface display and an idle time indicator indicative of the detected idle time,
wherein the context information includes the UI indicator and the idle time indicator.

11. A computer-implemented method comprising:
detecting tenant interaction with an on-line service hosted by a multi-tenant computing system, wherein the on-line service is accessible, over a computer network, by a plurality of users associated with a tenant associated with the multi-tenant computing system;
based on the detected tenant interaction, generating tenant usage information indicative of usage of the on-line service by the plurality of users associated with the tenant;
generating context information corresponding to a context of the usage of the on-line service;
exposing a signal acquisition application programming interface (API) to a third party system, the signal acquisition API having a method configured to be called to obtain a tenant engagement signal indicative of the tenant usage information and the context information;
detecting a method call from the third party system, wherein the method call calls the method of the signal acquisition API and requests the tenant engagement signal; and
in response to the method call, providing the tenant engagement signal to the third party system through the signal acquisition API.

12. The computer-implemented method of claim 11 and further comprising:
interacting with a tenant engagement system to obtain the requested tenant engagement signal.

13. The computer-implemented method of claim 12 and further comprising:
generating a client engagement signal indicative of individual client engagement with the on-line service at a tenant organization; and
wherein the context information includes the client engagement signal.

14. The computer-implemented method of claim 13 and further comprising:
automatically identifying a step, of a plurality of steps, that a user has completed in a predefined on-boarding process that is used by a user to set up and configure the on-line service; and
generating a step identifier indicative of the identified step; and
wherein the context information includes the step identifier.

15. The computer-implemented method of claim 14 and further comprising:
detecting a rate with which the user has completed the steps in the on-boarding process; and
generating a rate indicator indicative of the detected rate; and
wherein the context information includes the rate indicator.

16. The computer implemented method of claim 15 and further comprising:
accessing a set of context-to-problem mappings based on the step identifier and the rate indicator; and
identifying an on-boarding issue; and
wherein the context information includes the on-boarding issue.

17. A computing system, comprising:
a processor; and
memory storing instructions executable by the processor, wherein the instructions, when executed configure the computing system to provide:
a service hosting component configured to host an on-line service for a tenant, wherein the hosted on-line service is accessible, over a computer network, by a client device associated with the tenant;
an on-boarding step identifier configured to:
automatically identify a step, of a plurality of steps, that a user has completed in a predefined on-boarding process that is used by to set up and configure the on-line service; and
generate a step identifier indicative of the identified step;
rate detection logic configured to:
detect a rate with which the user is completing the steps in the on-boarding process; and
generate a rate indicator indicative of the detected rate;
an engagement context system configured to:
based on the step identifier and the rate indicator, generate engagement context information, indicative of a context of the usage of the hosted on-line service by the tenant:
a problem identification system configured to:
access a set of context-to-problem mappings, that map context information to different on-boarding issues related to the on-line service; and
based on the set of context-to-problem mappings, identify a particular on-boarding issue that is mapped to the generated engagement context information; and
a signal exposure system configured to:
expose a signal acquisition application programming interface (API) to a third party system, the signal exposure API having a method that is called to obtain a tenant engagement signal indicative of the particular on-boarding issue.

18. The computing system of claim 17 wherein the service hosting component comprises a multi-tenant computing system configured to generate tenant usage information indicative of tenant use of the on-line service, and the instructions, when executed configure the computing system to provide:
- client side engagement sensing logic configured to generate a client engagement signal indicative of individual client engagement with the on-line service at a tenant organization; and
- a web server front end system configured to:
  - provide an interface between the multi-tenant computing system and the tenant; and
  - generate client interaction information indicative of individual client interaction with the on-line service,
- the signal exposure system being configured to expose the client engagement signal, the tenant usage information and the client interaction information through the signal acquisition API as the tenant engagement signal.

\* \* \* \* \*